(12) United States Patent  
Hosseini et al.

(10) Patent No.: US 11,330,468 B2  
(45) Date of Patent: May 10, 2022

(54) LOW POWER TECHNIQUES FOR BLUETOOTH LOW ENERGY IN SCANNING STATE

(71) Applicant: QUALCOMM Incorporated, San Diego, CA (US)

(72) Inventors: Seyed Mohammad Ehsan Hosseini, San Diego, CA (US); Le Nguyen Luong, San Diego, CA (US); Eunmo Kang, San Diego, CA (US); Dongsik Kim, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 120 days.

(21) Appl. No.: 16/832,425

(22) Filed: Mar. 27, 2020

(65) Prior Publication Data

US 2021/0306909 A1 Sep. 30, 2021

(51) Int. Cl.
| | |
|---|---|
| *H04W 4/00* | (2018.01) |
| *H04W 28/06* | (2009.01) |
| *H04W 4/80* | (2018.01) |
| *H04W 8/00* | (2009.01) |
| *H04W 48/16* | (2009.01) |
| *H04W 52/02* | (2009.01) |
| *H04W 84/18* | (2009.01) |

(52) U.S. Cl.
CPC ............ *H04W 28/06* (2013.01); *H04W 4/80* (2018.02); *H04W 8/005* (2013.01); *H04W 48/16* (2013.01); *H04W 52/0216* (2013.01); *H04W 52/0229* (2013.01); *H04W 52/0235* (2013.01); *H04W 84/18* (2013.01)

(58) Field of Classification Search
CPC ....... H04W 28/06; H04W 4/80; H04W 8/005; H04W 48/16; H04W 52/0216; H04W 52/0229; H04W 52/0235; H04W 84/18
USPC .......................................................... 370/329
See application file for complete search history.

(56) References Cited

U.S. PATENT DOCUMENTS

| | | | |
|---|---|---|---|
| 2002/0071477 A1* | 6/2002 | Orava | .................... H04L 7/042 375/132 |
| 2005/0286466 A1* | 12/2005 | Tagg | ................. H04W 36/0022 370/329 |

(Continued)

OTHER PUBLICATIONS

International Search Report and Written Opinion—PCT/US2021/023111—ISA/EPO—dated Jul. 13, 2021.

*Primary Examiner* — Marceau Milord
(74) *Attorney, Agent, or Firm* — Procopio, Cory, Hargreaves & Savitch

(57) ABSTRACT

This disclosure provides systems, devices, apparatus, and methods, including computer programs encoded on storage media, related to low power techniques for a BLE device during a scanning state. The BLE device is configured to scan for a preamble of a packet while in a first power mode and detect when a bit of the preamble is received. Upon detecting that the bit of the preamble is received, the BLE device switches from the first power mode to a second power having a higher operating power for the BLE device than the first power mode. The switch in power modes occurs while the preamble is being received or immediately after the preamble is received and before an access address of the packet is received. The BLE device, while in the second power mode, then scans for the access address of the packet.

55 Claims, 13 Drawing Sheets

(56) References Cited

U.S. PATENT DOCUMENTS

| | | | |
|---|---|---|---|
| 2008/0125885 A1* | 5/2008 | McNutt | H04L 25/4908 700/81 |
| 2011/0211511 A1* | 9/2011 | Bakthavathsalu | H04W 52/0254 370/311 |
| 2012/0163344 A1* | 6/2012 | Bakthavathsalu | H04W 36/30 370/332 |
| 2012/0281638 A1* | 11/2012 | Ly-Gagnon | H04W 8/005 370/329 |
| 2016/0162015 A1* | 6/2016 | Moon | G06F 1/3287 713/310 |
| 2017/0280399 A1* | 9/2017 | Chrisikos | H04W 52/38 |
| 2018/0027490 A1* | 1/2018 | Liu | H04W 52/0216 370/311 |
| 2018/0102961 A1* | 4/2018 | Emmanuel | G01S 5/0294 |
| 2018/0234358 A1* | 8/2018 | Jakubov | H04W 4/80 |
| 2019/0140908 A1* | 5/2019 | Ma | H04L 41/12 |
| 2019/0191374 A1 | 6/2019 | Murali et al. | |
| 2019/0335535 A1* | 10/2019 | Li | H04W 72/02 |
| 2019/0349426 A1* | 11/2019 | Smith | H04L 41/12 |
| 2020/0015043 A1* | 1/2020 | Patil | H04W 48/08 |
| 2020/0038949 A1* | 2/2020 | Song | B22F 1/0018 |
| 2020/0319324 A1* | 10/2020 | Au | G01S 7/006 |
| 2020/0389469 A1* | 12/2020 | Litichever | H04L 63/1425 |
| 2021/0152976 A1* | 5/2021 | Daoura | G01S 1/00 |
| 2021/0256833 A1* | 8/2021 | Daoura | H04W 4/029 |

* cited by examiner ated later.

LOW POWER TECHNIQUES FOR BLUETOOTH LOW ENERGY IN SCANNING STATE

BACKGROUND

Technical Field

The present disclosure relates generally to communication systems, and more particularly, to low power techniques for Bluetooth® Low Energy (BLE) in a scanning state of a device.

Introduction

A wireless personal area network (WPAN) is a personal, short-range wireless network for interconnecting devices centered around a specific distance from a user. WPANs have gained popularity because of the flexibility and convenience in connectivity that WPANs provide. WPANs, such as those based on short-range wireless communications protocols, provide wireless connectivity to devices by providing wireless links that allow connectivity within a specific distance, such as 5 meters, 10 meter, 20 meters, 100 meters, etc.

Short-range wireless communications protocols may include the Bluetooth® (BT) protocol, the BLE protocol, the Zigbee® protocol, and so forth. BT is a wireless technology standard that enables radio frequency communication with ultra-high frequency (UHF) radio waves in the globally accepted Industrial, Scientific & Medical (ISM) band, such as from 2.400 gigahertz (GHz) to 2.485 GHz. Similarly, BLE defines a standard that enables radio frequency communication operating within the 2.4 GHz ISM band.

A short-range wireless communications protocol may be used to connect devices over a WPAN. Examples of devices that may communicate over a WPAN may include laptop computers, tablet computers, smart phones, personal data assistants, audio systems such as headsets, headphones, speakers, etc., wearable devices such as smart watches, fitness trackers, etc., battery-operated sensors and actuators in various medical, industrial, consumer, and fitness applications, and so forth.

In some scenarios, WPANs may offer advantages and conveniences over other network types, such as a wireless local area network (WLAN). However, short-range wireless communications in a WPAN may be susceptible to the same or similar issues as communication in other wireless networks. For example, short-range wireless communications may experience errors due to noisy and/or congested transmission mediums. Such issues experienced with short-range wireless communications may degrade the performance of devices, may degrade a user experience, and so forth. Thus, a need exists for an approach for addressing one or more missed packets in short-range wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

BLE devices may be configured for two different operating states: a connection state and a scanning state. In the connection state, the BLE devices may communicate with each other over an established connection. In the scanning state, however, a BLE device may need to perform a periodic scan of different channels to "discover" other devices that are transmitting BLE packets. The scanning period is typically long (e.g., 10 milliseconds) in comparison to a time period required to process the bits of a received BLE packet, which may be in the order of microseconds. Thus, frequent scans of the different channels may have a significant impact on an overall power consumption by a receiver of the BLE device.

While setting the receiver of the BLE device to a low power mode during scanning operations may be desirable, a high power mode may still be needed for processing the bits of the received BLE packet. Further, switching the BLE device from the low power mode to the high power mode may result in additional noise to the received signal that may cause a packet reception error for the bits of the BLE packet at a transition time of the power modes. If the transition from the low power mode to the high power mode occurs during receipt of an access address or a payload of the BLE packet and a bit therefrom becomes corrupted, the BLE device may not be in compliance with certain BLE protocols. Thus, it may be desirable to switch from the low power mode of the scanning state to the high power mode of packet processing, prior to receiving an access address of the packet. However, not knowing when a BLE packet is about to arrive at the receiver during a scan, such that a timing of the switch in power modes occurs before the access address arrives, may require the BLE device to be continuously maintained in the high power mode from a start of the scan through an end of BLE packet processing.

BLE packets may be divided into a preamble, an access address, and a payload, that are received by the BLE device in that order. While the preamble may be much shorter in duration than the access address and the payload, and therefore more difficult to detect, the bits of the preamble may have a common pattern used across all BLE device transmissions. Accordingly, execution of a preamble detection algorithm configured to identify the preamble of an incoming BLE packet, despite the short duration of the preamble (e.g., 8 bits), may allow the BLE device to detect the incoming BLE packet before any bits of the access address arrive at the receiver of the BLE device. As such, the BLE device may be switched from the low power mode to the higher mode while the preamble is still being received or immediately after the preamble is received but before the access address is received, such that if a bit is corrupted as a result of the switch in power modes, the corrupted bit corresponds to the preamble and not to the access address or the payload.

With respect to the BLE protocol that prohibits corruption of bits of the access address and the payload, the bits of the preamble may not be subject to the same requirement. Thus, even if a preamble bit is corrupted by the switch from the low power mode to the high power mode, the BLE device may still be in compliance with the BLE protocol. The timing of such a switch during the preamble permits the receiver to operate in the low power mode while scanning for BLE packets and subsequently transition to the high power mode for packet processing without impacting reception of the access address and the payload.

In an aspect of the disclosure, a method, a computer-readable medium, and an apparatus are provided. The apparatus may scan while in a first power mode for a preamble of a packet and be configured to detect that a bit of the preamble is received. The apparatus may be switched from the first power mode to a second power mode upon detecting that the bit of the preamble is received, where the second power mode has a higher operating power for the communication device than the first power mode and the switching occurring while the preamble is being received or immediately after the preamble is received and before an access address of the packet is received. The apparatus is further configured to scan, while in the second power mode, for the access address of the packet.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
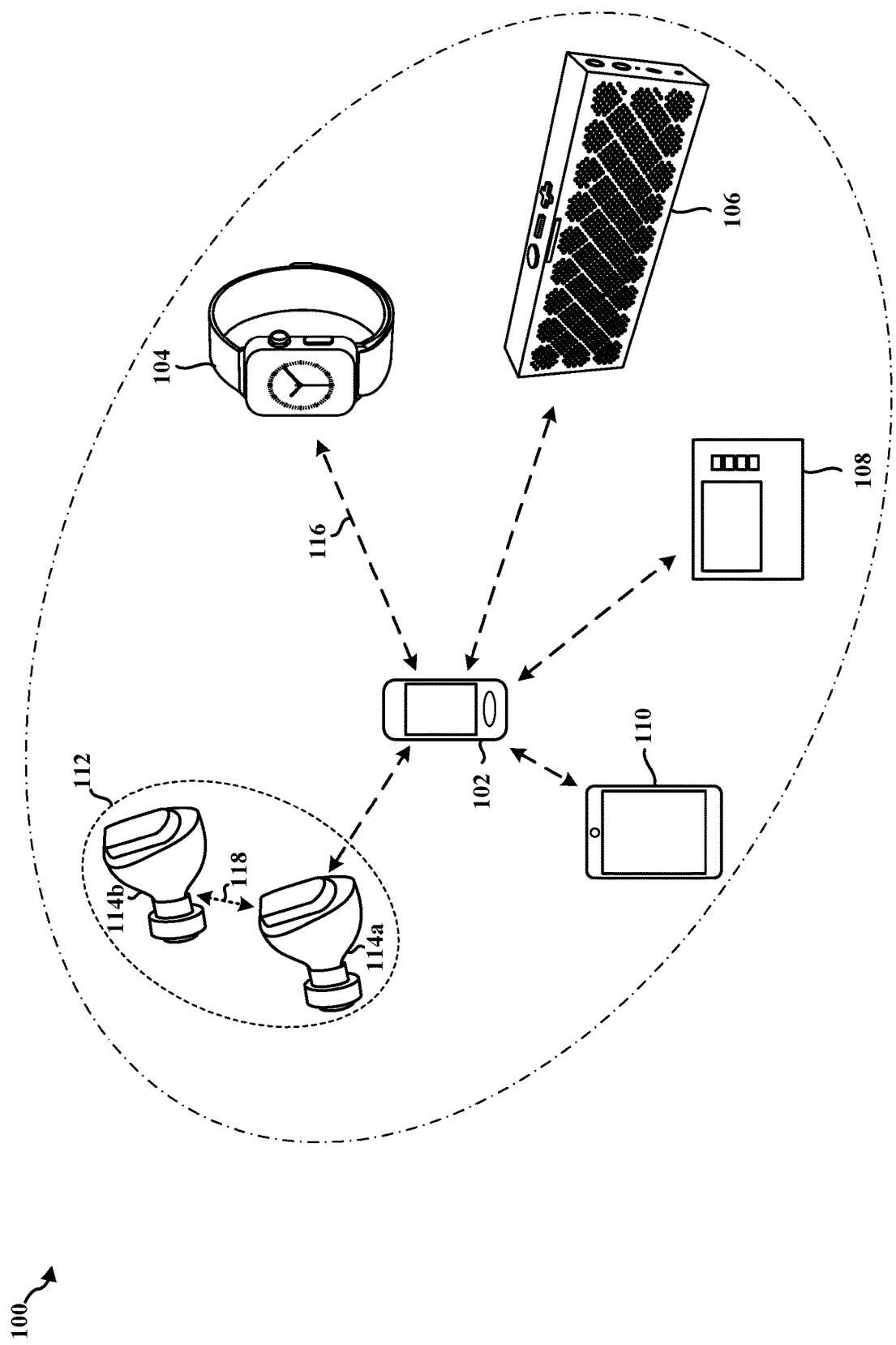
FIG. 1 is a diagram illustrating an example of a short-range wireless communications system, in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with certain aspects of the disclosure. Within the WPAN 100, a wireless source device 102 may use a communications link 116 to communicate with one or more peripheral devices 104, 106, 108, 110, 112 using a short-range wireless communications protocol. The short-range wireless communications protocol may include a Bluetooth® (BT) protocol and/or a BT Low Energy (BLE) protocol.

Examples of the source device 102 include a cellular phone, a smart phone, a session initiation protocol (SIP) phone, a mobile station (STA), a laptop, a personal computer (PC), a desktop computer, a personal digital assistant (PDA), a satellite radio, a global positioning system (GPS), a multimedia device, a video device, a digital audio player, a camera, a game console, a tablet, a smart device, a wearable device, a vehicle, an ear piece, a wireless headset, an Internet-of-Things (IoT) device, or any other similarly functioning device.

Examples of the one or more peripheral devices 104, 106, 108, 110, 112 include a cellular phone, a smart phone, a SIP phone, a STA, a laptop, a PC, a desktop computer, a PDA, a satellite radio, a GPS, a multimedia device, a video device, a digital audio player, a camera, a game console, a tablet, a smart device, a wearable device, a vehicle, an ear piece, a wireless headset, an IoT device, or any other similarly functioning device. Although the source device 102 is illustrated in communication with six peripheral devices 104, 106, 108, 110, 112 in the WPAN 100, the source device 102 may communicate with more or fewer than six peripheral devices within the WPAN 100 without departing from the scope of the present disclosure.

A device, such as the source device 102, implementing the BT protocol may operate according to one radio mode, such as basic rate (BR)/enhanced data rate (EDR). Similarly, a device implementing the BLE protocol may operate according to a BLE radio mode. In some aspects, a device, such as the source device 102, may be configured with dual radio modes, and therefore may be able to operate according to the BR/EDR mode or the BLE mode, for example, based on the type of short-rage wireless communication in which the device may engage.

For example, the device may operate according to the BR/EDR mode for continuous streaming of data, for broadcast networks, for mesh networks, and/or for some other applications in which a higher data rate may be more suitable. However, the device may operate according to the BLE mode for short burst data transmissions and/or for some other applications in which power conservation may be desirable and/or a lower data rate may be acceptable. In other aspects, a device may operate according to one or more other radio modes, including proprietary radio modes, such as high speed radio modes, low energy radio modes, isochronous radio modes, etc.

A short-range wireless communications protocol, such as BT, BLE, and/or BR/EDR, may include and/or may use one or more other communications protocols, for example, for establishing and maintaining communications links. As illustrated, the source device 102 may establish a communications link 116 with at least one other device, such as a wireless headset 112, according to at least one communications protocol for short-range wireless communications.

The communications link 116 may include a communications link that adheres to a protocol included and/or for use with BT, BLE, BR/EDR, etc. In one aspect, the communications link 116 may include an asynchronous connection-less (ACL) link. With ACL, the source device 102 may connect (or "pair" in the terminology of the BT specification) with a second device, such as the headset 112. The connection is asynchronous in that the two devices may not need to synchronize, time-wise, data communications between each other to permit communication of data packets via the communications link 116.

A Logical Link Control and Adaptation Protocol (L2CAP) may be used within the BT protocol stack to pass packets to either the host controller interface (HCI) or, for a "hostless" system, directly to the link manager/ACL link. An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In one aspect, the communications link 116 may include an Advanced Audio Distribution Profile (A2DP) link. An A2DP link provides a point-to-point link between a source device, such as the source device 102, and a sync device, such as the headset 112. With an A2DP link, data packets including audio may be transmitted over an ACL data channel, and other information, for example, for controlling the audio stream, may be transmitted over a separate control channel. The data packets may occur non-periodically.

In another aspect, the communications link 116 may support synchronous logical transport mechanisms between a "master device" and a "slave device." For example, the communications link 116 may include a synchronous connection-oriented (SCO) link. A SCO link may provide a symmetric point-to-point link between a master device, such as the source device 102, and a slave device, such as the headset 112, using time slots reserved for BT communications. However, a SCO link may not support retransmission of data packets, which may be unsatisfactory in audio streaming and/or voice use cases in which a dropped audio or voice packet may reduce the quality of the user experience.

In a further aspect, the communications link 116 may include an extended SCO (eSCO) link. An eSCO link may provide a symmetric or asymmetric point-to-point link between a master device and a slave device using time slots reserved for BT communications, and may also provide for a retransmission window following the reserved time slots. Because retransmissions may be facilitated using the retransmission window, an eSCO link may be suitable for audio streaming and/or voice use cases because a dropped audio or voice packet may be retransmitted, and therefore the probability of successfully receiving a data packet may be increased.

In one aspect, the communications link 116 may include an isochronous (ISO) link. With an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped and the receiving device may continue to receive the stream without data from the dropped data packet.

In a further aspect, the source device 102 may establish the communications link 116 with the wireless headset 112. In some configurations, the wireless headset 112 may include two earpieces (114a and 114b) that implement a protocol stack, such as a BT protocol stack configured for BR/EDR, at respective components and/or circuits. Thus, the communications link 116 may be established at a protocol stack through a first or "primary" earpiece 114a of the headset 112. In effect, when the source device 102 establishes the communications link 116 with the headset 112, the communications link 116 may be established through the primary earpiece 114a. For example, a logical link, such as an ACL link, L2CAP link, etc., may exist at one or more layers of the protocol stack through the primary earpiece 114a. In some aspects, the secondary earpiece 114b may communicate over a short-range communications link 118 with the primary earpiece 114a. The short-range communications link 118 may be, for example, a BT link (e.g., BR/EDR link), a BLE link, a near-field magnetic induction (NFMI) link, or any other suitable short-range wireless communications link.

Due to various factors, wireless devices may cause congestion on the frequencies used for wireless channels, such as a wireless channel on which the communications link 116 is carried. Consequently, wireless communication channels, including the wireless communications channel on which the communications link 116 is carried, may be "noisy" in that static, congestion, and/or other interference may introduce random signals on the same frequency bands as those reserved to communicate over the established communications link 116. Such static, congestion, interference, and/or other random signals may cause errors to packets transmitted on the communications link 116 and/or may cause packets transmitted over the communications link 116 to be missed.

In some standards and protocols, such as BLE and/or BR/EDR, the source device 102 may detect errors in a packet and/or a dropped/missed/not received packet through the use of cyclic redundancy check (CRC) validation and through the use of message integrity code (MIC) validation. MIC validation may be used when a packet is encrypted. For example, failure of CRC validation may indicate one or more errors in a received packet and failure of MIC validation may indicate that another packet has not been received (although failure of CRC validation may also indicate another packet has not been received and/or failure of MIC validation may also indicate one or more errors in a received packet).

CRC validation and MIC validation may be based on generating CRC values and MICs, respectively, based on received packets and respectively comparing those generated CRC values and MICs to CRC and MICs included in received packets. Specifically, a receiving device, such as the headset 112, that receives a packet may first generate a CRC value or a CRC checksum based on the received packet, such as based on a payload and, if applicable, a MIC included in the received packet. The receiving device may compare the generated CRC value with a CRC value included in the received packet. If the generated CRC value matches the CRC value included in the received packet, then the received packet may be validated for CRC. The CRC-validated received packet may then be decrypted. However, if the generated CRC value does not match the CRC value included in the received packet, then the receiving device may determine that the received packet fails CRC validation. If the receiving device determines the received packet fails CRC validation, then the received packet may include errors and/or may be corrupted. In one configuration, the receiving device may discard the received packet that fails CRC validation; however, in another configuration, the receiving device may attempt to recover the received packet, for example, using one or more error correction techniques.

If the received packet is encrypted and passes CRC validation, then the receiving device may decrypt the received packet to obtain a decrypted payload and a decrypted MIC. For MIC validation, the receiving device may generate a MIC based on the decrypted payload, and compare the generated MIC with the MIC obtained from the decrypted received packet. If the generated MIC matches the decrypted MIC, then the receiving device may determine that the received packet is successfully decrypted. When the received packet is successfully decrypted, the decoded and decrypted payload of the received packet may be provided to another layer of the receiving device, such as a coder-decoder (codec) of the receiving device that may cause the payload data of the received packet to be output by the receiving device, for example, as audio through speakers of the headset 112.

If the generated MIC does not match the decrypted MIC of the received packet, then the receiving device may determine that the received packet is unsuccessfully decrypted. When the received packet is unsuccessfully decrypted, then a different packet may have been missed or the received packet may be erroneous or otherwise corrupted. In one configuration, the receiving device may discard the received packet that fails MIC validation; however, in another configuration, the receiving device may attempt to recover the received packet.

Figure 2:
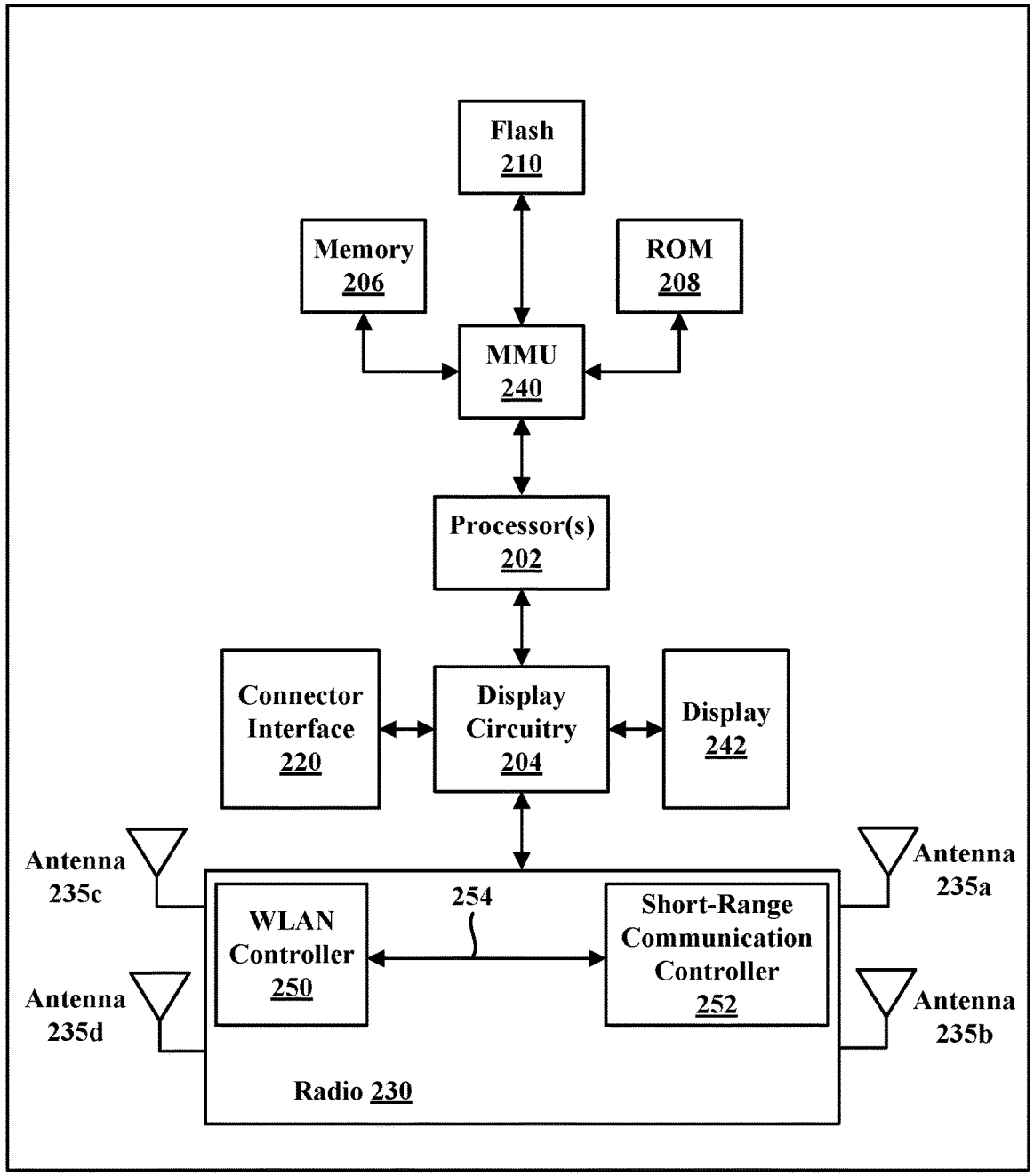
FIG. 2 is block diagram of a short-range wireless communications device, in accordance with certain aspects of the disclosure.

FIG. 2 is block diagram of a wireless device 200 in accordance with certain aspects of the disclosure. The wireless device 200 may correspond to, for example, the source device 102, and/or one of the peripheral devices 104, 106, 108, 110, 112 in FIG. 1. In certain configurations, the wireless device 200 may be, for example, a BT and/or BLE device that is configured to construct a PDU (e.g., an L2CAP PDU) using a selective relay mechanism for selectively relaying packets and/or corresponding information.

As shown in FIG. 2, the wireless device 200 may include a processing unit, such as a processor(s) 202, which may execute program instructions for the wireless device 200. The wireless device 200 may also include display circuitry 204, which may perform graphics processing and provide display signals to a display 242. The processor(s) 202 may also be coupled to a memory management unit (MMU) 240, which may be configured to receive addresses from the processor(s) 202 and translate those addresses to locations in memory, such as memory 206, ROM 208, Flash memory 210, and/or to other circuits or devices, such as the display circuitry 204, a radio 230, a connector interface 220, and/or the display 242. The MMU 240 may be configured to perform memory protection and page table translation or set up. In some aspects, the MMU 240 may be included as a portion of the processor(s) 202.

As shown, the processor 202 may be coupled to various other circuits of the wireless device 200. For example, the wireless device 200 may include various types of memory, the connector interface 220, which may allow for coupling to the computer system, the display 242, and/or wireless communications circuitry, which may facilitate Wi-Fi, BT, BLE, etc. The wireless device 200 may include a plurality of antennas 235a, 235b, 235c, 235d, for performing wireless communication with other short-range wireless communications devices, including BT devices, BLE devices, etc.

In certain aspects, the wireless device 200 may include hardware and software components (a processing unit) configured to separately check the header of the data packet for errors and perform majority voting of a data packet, for example, using the techniques described herein. The wireless device 200 may also include firmware or other hardware/software for controlling short-range wireless communications operations, such as BT operations, BLE operations, etc. In addition, the wireless device 200 may store and execute a WLAN software driver for controlling WLAN operations.

The wireless device 200 may be configured to implement part or all of the error correction techniques described herein, for example, by executing program instructions stored on a memory medium, such as a non-transitory computer-readable memory medium, and/or through hardware or firmware operations. In other aspects, the error correction techniques described herein may be at least partially implemented by a programmable hardware element, such as a field programmable gate array (FPGA), and/or an application specific integrated circuit (ASIC).

In certain aspects, the radio 230 may include separate controllers configured to control communications for various respective radio access technology (RAT) protocols. For example, as shown in FIG. 2, radio 230 may include a wireless local area network (WLAN) controller 250 configured to control WLAN communications and a short-range communications controller 252 configured to control short-range communications, such as BT communications, BLE communications, etc. A coexistence interface 254 may be used for sending information between the WLAN controller 250 and the short-range communications controller 252.

In some aspects, one or more of the WLAN controller 250 and/or the short-range communications controller 252 may be implemented as hardware, software, firmware or some combination thereof.

In certain aspects, the WLAN controller 250 may be configured to communicate with a second device over a WLAN link using all of the antennas 235a, 235b, 235c, 235d. In certain configurations, the short-range communications controller 252 may be configured to implement a short-range wireless communications protocol stack, such as a BT stack (FIG. 3A, infra) and/or a BLE stack (FIG. 3B, infra), and communicate with at least one second wireless device using one or more of the antennas 235a, 235b, 235c, 235d. The short-range communications controller 252 may be configured to reconstruct a PDU (e.g., an L2CAP PDU) when the wireless device 200 is receiving or passively monitoring for packets sent by a source wireless device.

Figure 3A:
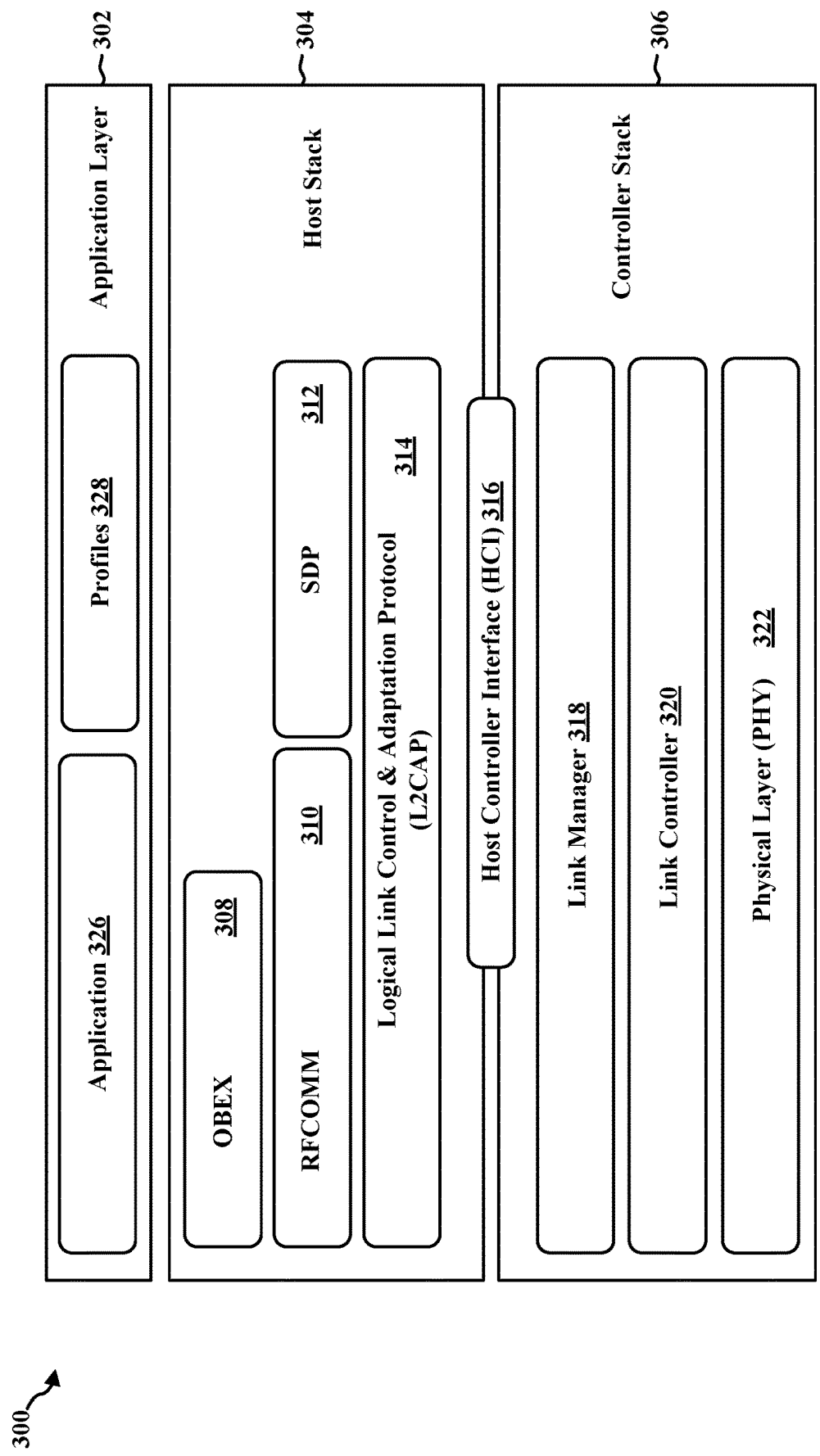
FIG. 3A is a diagram illustrating a BT protocol stack that may be implemented by a BT device, in accordance with certain aspects of the disclosure.

FIG. 3A illustrates a BT protocol stack 300 that may be implemented in a wireless device in accordance with certain aspects of the disclosure. For example, the BT protocol stack 300 may be implemented by one or more of processor(s) 202, memory 206, Flash memory 210, ROM 208, the radio 230, and/or the short-range communication controller 252 illustrated in FIG. 2.

Referring to FIG. 3A, the BT protocol stack 300 may be organized into lower layer(s), a middle layer(s), and upper layer(s). The lower layer(s) of the BT protocol stack 300 may include a controller stack 306, which may be used for, inter alia, hardware interface management, link establishment, and link management. The middle layer(s) of the BT protocol stack 300 may include a host stack 304, which may be used for, inter alia, application (layer) interface management to allow an application (layer) to access short-range wireless communications. The higher layer(s) of the BT protocol stack 300 may include an application layer 302, which may include one or more applications and one or more profiles that allow the one or more applications to use BT communications.

The controller stack 306 may include a physical (PHY) layer 322. The PHY layer 322 may include, for example, a radio and/or a baseband processor. In some aspects, the PHY layer 322 may define the mechanism for transmitting a bit stream over a physical link or channel that connects BT devices. The bit stream may be grouped into code words or symbols, and converted to a data packet that is transmitted over a wireless transmission medium. The PHY layer 322 may provide an electrical, mechanical, and/or procedural interface to the wireless transmission medium. The PHY layer 322 may be responsible for modulation and demodulation of data into radio frequency (RF) signals for transmission over the air. The PHY layer 322 may describe the physical characteristics of a wireless device's receiver/transmitter. The physical characteristics may include modulation characteristics, radio frequency tolerance, sensitivity level, etc.

The controller stack 306 may further include a link controller 320. The link controller 320 may be responsible for properly formatting data for providing to and obtaining from the PHY layer 322. Further, the link controller 320 may perform synchronization of links, including logical links such as ACL links, A2DP links, SCO links, eSCO links, ISO links, etc. The link controller 320 may be responsible for executing commands and instructions issued by a link manager 318, including establishing and maintaining links instructed by the link manager 318.

The link manager 318 may translate host controller interface (HCI) 316 commands into controller-level operations, such as baseband-level operations. The link manager 318 may be responsible for establishing and configuring links and managing power-change requests, among other tasks. Each type of logical link, such as ACL links, A2DP links, SCO links, eSCO links, ISO links, etc., may be associated with a specific packet type. For example, an SCO link may provide reserved channel bandwidth for communication between a master device and a slave device, and support regular, periodic exchange of data packets with no retransmissions. An eSCO link may provide reserved channel bandwidth for communication between a master device and a slave device, and support regular, periodic exchange of data packets with retransmissions. An ACL link may exist between a master device and a slave device from the beginning of establishment of a connection between the master device and the slave device, and the data packets for ACL links may include encoding information in addition to a payload.

The link manager 318 may communicate with the host stack 304 through a host controller interface (HCI) 316. For example, the link manager 318 may translate HCI 316 commands into controller-level operations, such as baseband-level operations. The HCI 316 may act as a boundary between the lower layers, such as the controller stack 306, of the BT protocol stack 300 and the other layers of the BT protocol stack, such as the host stack 304 and/or the application layer 302. The BT specification may define a standard HCI to support BT systems that are implemented across two separate processors. For example, a BT system on a computer might use the BT system's own processor to implement the lower layers of the stack, such as the PHY layer 322, the link controller 320, and/or the link manager 318. The BT system might use a processor of a BT component to implement the other layers, such as the host stack 304 and the application layer 302. In some aspects, however, the BT system may be implemented on a same processor, and such a BT system may be referred to as a "hostless" system.

The host stack 304 may include at least a Logical Link Control and Adaptation Protocol (L2CAP) layer 314, a service discovery protocol (SDP) layer 312, a radio frequency communication (RFCOMM) layer 310, and an object exchange (OBEX) layer 308. The L2CAP layer 314 is implemented above the HCI 316, and may communicate through the HCI 316. The L2CAP layer 314 may be primarily responsible for establishing connections across some existing links, such as logical links including ACL links, and/or requesting some links if those do not already exist. Further, the L2CAP layer 314 may implement multiplexing between different higher-layer protocols, such as SDP protocols and RFCOMM protocols, which may to allow different applications to use a single link, such as a logical link, including an ACL link. In addition, the L2CAP layer 314 may repackage data packets received from higher layers into a format expected by lower layers. The L2CAP layer 314 may employ the concept of channels to keep track of where data packets come from and where data packets should go. A channel may be a logical representation of the data flow or stream between the L2CAP layer 314 at a transmitting device (such as a master device) and another L2CAP layer 314 at a receiving device (such as a slave device).

The SDP layer 312 may define actions for both servers and clients of BT services. The BT specification defines a service as any feature that may be usable by another (remote) BT device. An SDP client may communicate with an SDP server using a reserved channel on an L2CAP link to discover what services are available. When the SDP client finds the desired service, the SDP client may request a separate connection to use the service. The reserved channel may be dedicated to SDP communication so that a device knows how to connect to the SDP service on any other device. An SDP server may maintain an SDP database, which may include a set of service records that describe the services the SDP server offers. Along with information describing how an SDP client can connect to the service. The service records may contain a universally unique identifier (UUID) of the service.

The RFCOMM layer 310 may emulate the serial cable line settings and status of an RS-232 serial port. The RFCOMM layer 310 may connect to the lower layers of the BT protocol stack 300 through the L2CAP layer 314. By providing serial-port emulation, the RFCOMM layer 310 may support legacy serial-port applications. The RFCOMM layer 310 may also support the Object Exchange (OBEX) layer 308.

The OBEX layer 308 may define a communication protocol that may be used by devices to exchange data objects, and the data objects may also be defined by the OBEX layer 308. A BT device that wants to set up an OBEX communication session with another device may be considered the client device. The client device initially may send one or more SDP requests to ensure that the other device can act as a server of OBEX services. If the server device can provide OBEX services, the server device may respond with the OBEX service record of the server device. The OBEX service record may contain an RFCOMM channel number that the client device may use to establish an RFCOMM channel. Further communication between the two devices may be conveyed in packets, which may contain requests, responses, and/or data. The format of the packet may be defined by the OBEX session protocol.

The application layer 302 may include at least one application 326, with which a user may interact and which may access BT communications for various functionalities. The application 326 may access BT communications through one or more profiles 328, which may describe a variety of different types of tasks. By following procedures of one or more profiles 328, the application 326 may use BT communications according to a BT specification.

Figure 3B:
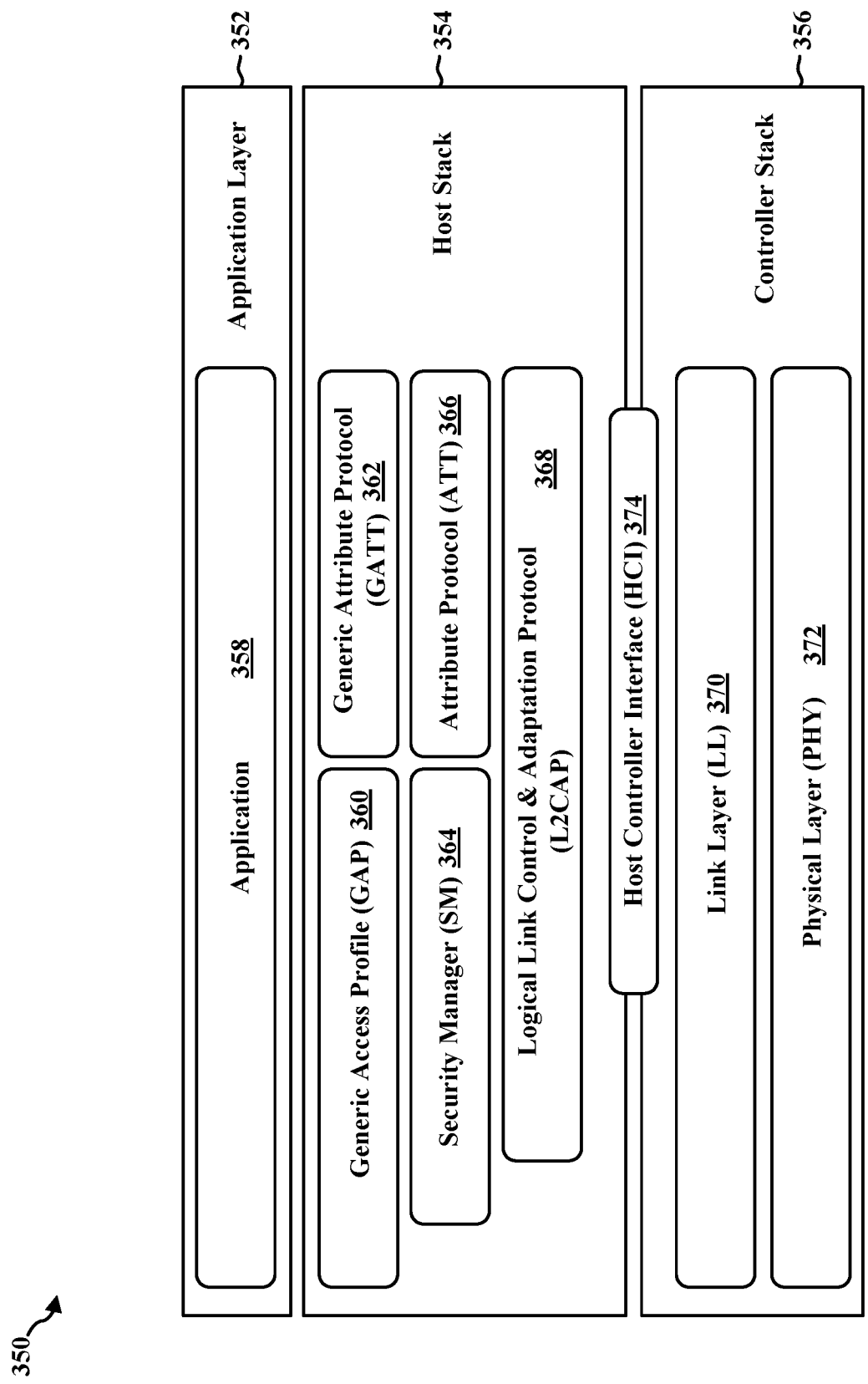
FIG. 3B is a diagram illustrating a BLE protocol stack that may be implemented by a BLE device, in accordance with certain aspects of the disclosure.

FIG. 3B illustrates a BLE protocol stack 350 that may be implemented in a BLE device. For example, the BLE protocol stack 350 may be implemented by one or more of processor(s) 202, memory 206, Flash memory 210, ROM 208, the radio 230, and/or the short-range communications controller 252 illustrated in FIG. 2.

The BLE protocol stack 350 may be organized into three layers, which may include, an application layer 352, a host stack 354, and a controller stack 356. The controller stack 356 may be below the host stack 354 and the application layer 352 in the BLE protocol stack 350. The controller stack 356 may include a PHY layer 372 and a LL 370.

The PHY layer 372 may define the mechanism for transmitting a bit stream over a physical link that connects BLE devices. The bit stream may be grouped into code words or symbols, and converted to a data packet that is transmitted over a transmission medium. The PHY layer 372 may provide an electrical, mechanical, and procedural interface to the transmission medium. The shapes and properties of the electrical connectors, the frequency band used for transmission, the modulation scheme, and similar low-level parameters may be specified by the PHY layer 372.

The LL 370 is responsible for low-level communication over the PHY layer 372. The LL 370 manages the sequence and timing for transmitting and receiving data packets, and using a LL protocol, communicates with other devices regarding connection parameters and data flow control. The LL 370 also provides gatekeeping functionality to limit exposure and data exchange with other devices. If filtering is configured, the LL 370 maintains a list of allowed devices and will ignore all requests for data exchange from devices not on the list. The LL 370 may also reduce power consumption. In some aspects, the LL 370 may include a company's proprietary LL that may be used to discover peer devices, and establish a secure communication channel therewith. In certain aspects, the LL 370 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The BLE protocol stack 350 may include an HCI 374, which may act as a boundary between the lower layers (such as the controller stack 356) of the BLE protocol stack 350 and the other layers of the BLE protocol stack (such as the host stack 354 and the application layer 352). In addition, the host stack 354 may communicate with a BLE controller (such as the short-range communications controller 252 illustrated in FIG. 2) in a wireless device using the HCI 374. The LL 370 may use the HCI 374 to communicate with the host stack 354 of the BLE protocol stack 350. While some BLE systems may be "hostless," in that the host stack 354 and the controller stack 356 may be implemented on a same processor, the HCI 374 may also allow the host stack 354 to communicate with different controller stacks 356, such as when the controller stack 356 is implemented on a second processor.

The host stack 354 may include a generic access profile (GAP) 360, a generic attribute protocol (GATT) 362, a security manager (SM) 364, an attribute protocol (ATT) 366, and an L2CAP layer 368. The L2CAP layer 368 may encapsulate multiple protocols from the upper layers into a data packet format (and vice versa). The L2CAP layer 368 may also break packets with a large data payload from the upper layers into multiple packets with the data payload segmented into smaller size data payloads that fit into a maximum payload size (for example, twenty-seven bytes) on the transmit side. Similarly, the L2CAP layer 368 may receive multiple data packets carrying a data payload that has been segmented, and the L2CAP layer 368 may combine the segmented data payload into a single data packet carrying the data payload that will be sent to the upper layers (such as the application layer 352).

The ATT 366 includes a client/server protocol based on attributes associated with a BLE device configured for a particular purpose. Examples may include monitoring heart rate, temperature, broadcasting advertisements, etc. The attributes may be discovered, read, and written by peer devices. The set of operations which are executed over ATT 366 may include, but are not limited to, error handling, server configuration, find information, read operations, write operations, queued writes, etc. The ATT 366 may form the basis of data exchange between BLE devices.

The SM 364 may be responsible for device pairing and key distribution. A security manager protocol implemented by the SM 364 may define how communications with the SM of a counterpart BLE device are performed. The SM 364 provides additional cryptographic functions that may be used by other components of the BLE protocol stack 350. The architecture of the SM 364 used in BLE is designed to minimize recourse requirements for peripheral devices by shifting work to an assumingly more powerful central device. BLE uses a pairing mechanism for key distribution. The SM 364 provides a mechanism to not only encrypt the data but also to provide data authentication.

Above the host stack 354 in the BLE protocol stack 350, the application layer 352 may include an application 358, such as a user application which interfaces with the host stack 354 of the BLE protocol stack 350 for various functionality through BLE communications.

Referring back to the host stack 354, the GATT 362 may provide a service framework using the attribute protocol for discovering services, and for reading and writing characteristic values on a peer device. The GATT 362 may interface with the application 358, for example, through a profile which may define a collection of attributes and any permission needed for the attributes to be used in BLE communications. The GAP 360 may provide an interface for the application 358 to initiate, establish, and manage connections with other BLE devices.

In some aspects, a wireless device, such as the source device 102, the wireless device 200, etc., may be configured to communicate according to different standards and/or protocols. For example, the wireless device may be configured with both BT and BLE for short-range wireless communications. Accordingly, the wireless device may be configured with both the BT protocol stack 300 and the BLE protocol stack 350. In some aspects, one or more layers may be configured for use in both the BT protocol stack 300 and the BLE protocol stack 350. For example, the L2CAP layers (314, 368) of the protocol stacks (300, 350) may be configured for dual mode short-range wireless communications using either BT or BLE.

Figure 4A:
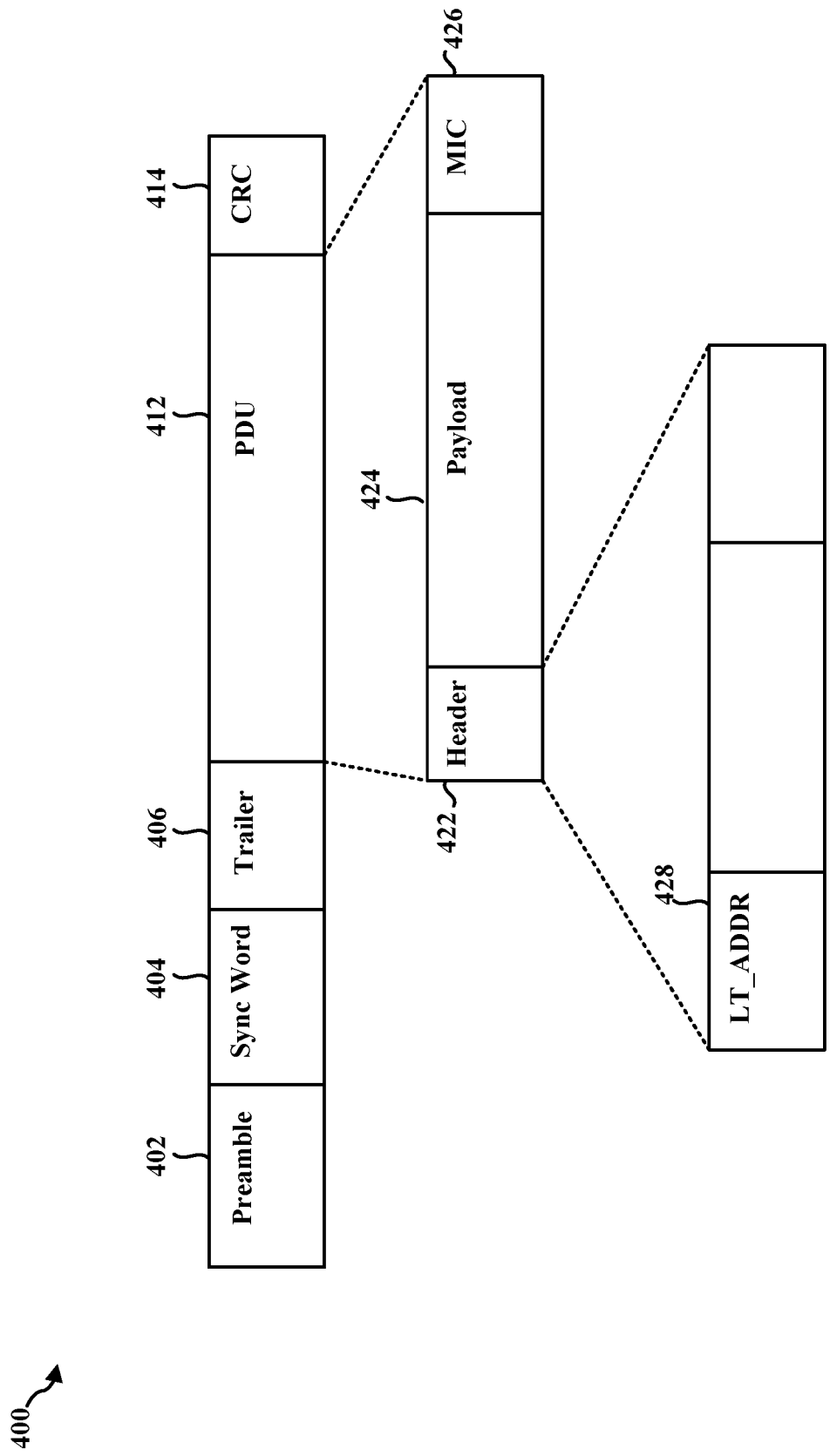
FIG. 4A is a diagram illustrating a BT data packet, in accordance with certain aspects of the disclosure.

FIG. 4A is a diagram illustrating a data packet 400 in accordance with certain aspects of the present disclosure. The data packet may be used with various short range wireless communications technologies, such as BT and BR/EDR. The data packet 400 may include a preamble 402, a sync word 404, a trailer 406, a PDU 412, and a CRC 414. In certain configurations, the data packet 400 may not include the CRC 414.

In certain configurations, the PDU 412 may include a header 422, a payload 424, and a MIC 426. The MIC includes information that may be used to authenticate a data packet (e.g., when the data packet is encrypted). In other words, the MIC may be used by the receiving device to confirm and/or authenticate that the message came from the stated transmitting device, and to confirm that the payload 424 has not been changed, which may provide data packet integrity. The MIC 426 protects both payload integrity and the authenticity of the data packet 400 by enabling a receiving device that also possess the secret key to detect any changes to the payload 424. In some aspects, the MIC 426 may be present when the packet 400 is encrypted (e.g., encrypted using AES-CCM encryption) but may be absent when the packet 400 is unencrypted.

In certain configurations, such as BR/EDR, the payload 424 (excluding the MIC 426 and header 422) may include an unencrypted baseband packet. For example, the payload 424 may include a payload portion (excluding a MIC and payload header) of an unencrypted baseband ACL-user data (ACL-U) packet.

In some aspects, the header 422 of the PDU 412 may include a plurality of fields, including at least an LT_ADDR 428. The LT_ADDR may indicate a logical transport address. The LT_ADDR 428 may be associated with a logical link. For example, a logical transport address included in the LT_ADDR 428 may indicate a type of logical link, including ACL, A2DP, eSCO, ISO, etc.

In certain configurations, the header 422 of the PDU 412 may include a logical link identifier (LLID). The LLID may be a two-bit field of the header 422.

Figure 4B:
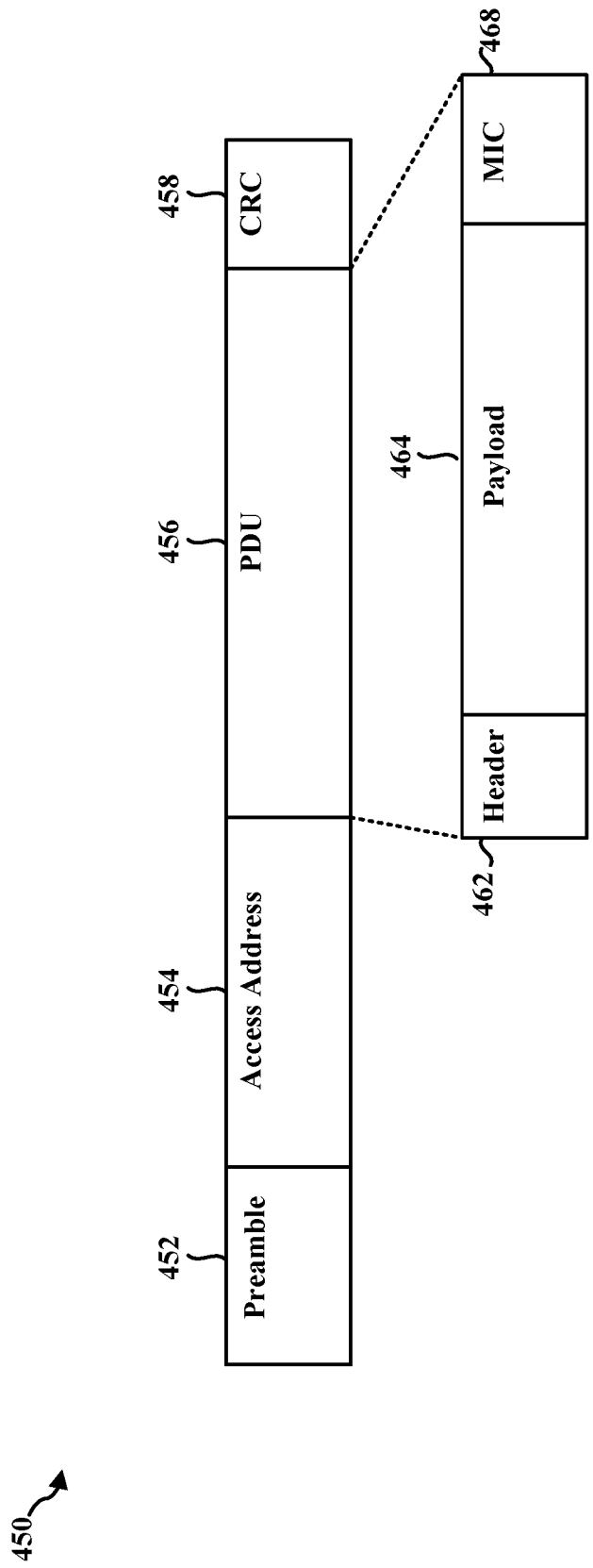
FIG. 4B is a diagram illustrating a BLE data packet, in accordance with certain aspects of the disclosure.

FIG. 4B is a diagram illustrating a data packet 450 in accordance with certain aspects of the present disclosure. The data packet may be used with various short range wireless communications technologies, such as BLE. The data packet 450 may include a preamble 452, an access address 454, a PDU 456, and a CRC 458. In certain configurations, the data packet 450 may not include the CRC 458.

In some aspects, the access address 454 may set the connection address of a link layer, such as the link layer 370. For example, the access address 454 may include an address that indicates a type of logical link, including ACL, A2DP, eSCO, ISO, etc.

In certain configurations, the PDU 456 may include a header 462, a payload 464, and a MIC 468. The MIC includes information that may be used to authenticate a data packet, such as when the data packet is encrypted. In some aspects, the header 462 of the PDU 456 may include a plurality of fields, including at least an LLID, which may be a two-bit field.

In certain configurations, the payload 464 (excluding the MIC 468 and header 462) may include an unencrypted baseband packet. For example, the payload 464 may include a payload portion (excluding a MIC and payload header) of an unencrypted baseband ACL-U packet.

Figure 5:
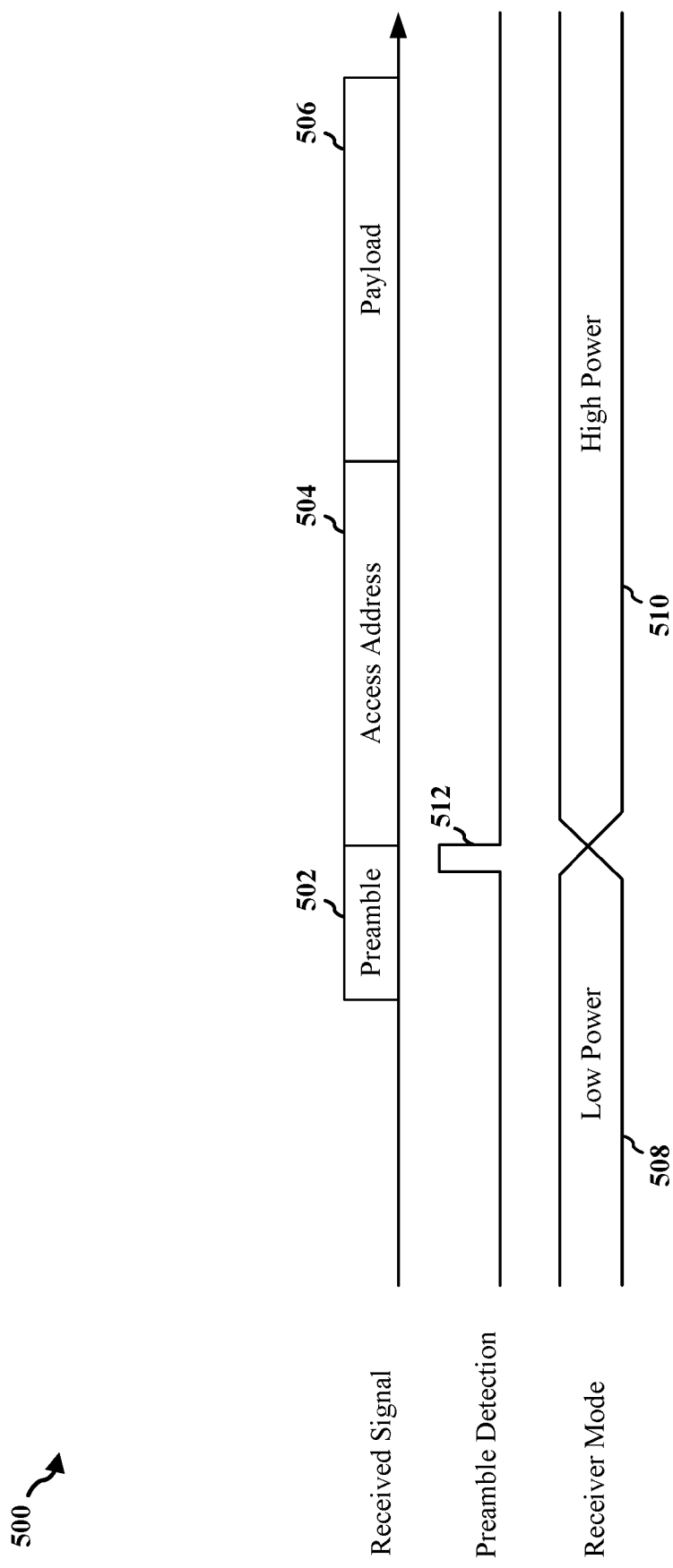
FIG. 5 is a timing diagram that corresponds to a packet received by a BLE device.

FIG. 5 is a timing diagram 500 that corresponds to a packet received by a BLE device. BLE devices may have two different operating states. A first operating state may include a connection state in which two devices may utilize an established connection to communicate with each other (e.g., the two devices may perform "handshaking" to facilitate a steady transmission/reception of packets between the two devices). In the connection state, an expected arrival time of the packets is known by the two devices based on the established connection. In contrast, a second operating state of a BLE device may include a scanning state in which the BLE device listens to different advertising channels in order to "discover" other devices that may be nearby.

A BLE device may activate the scanning state from time-to-time. For example, the BLE device may perform a periodic scan of the advertising channels in order to discover nearby devices. In some configurations, the scanning state may be activated for 10 milliseconds before the scanning state is once again deactivated. Given that a presence of a discoverable device may not be known to the BLE device, frequent scans of the surrounding environment required for detection of such devices may have a significant impact on an overall power consumption by a receiver of the BLE device. Hence, it may be desirable to reduce the power consumption by the receiver of the BLE device while the BLE device is in the scanning state.

One technique for reducing the power consumed by the receiver of the BLE device is to set radio frequency and analog (RFA) components of the receiver to a low power mode 508 during scanning events. However, employing such a technique may decrease a sensitivity of the receiver, which may further impact compliance with BLE protocols, as bits in an advertised packet (e.g., bits of an access address 504 and bits of a payload 506) may all need to be correctly identified by the BLE device for compliance with the BLE protocol. Accordingly, a reduction in the power consumption of the receiver during the scanning state may need to be performed without causing the sensitivity of the receiver to be significantly degraded.

A BLE packet of a received signal may include a fixed number of bits that, for example, correspond to a preamble 502, an access address 504, and a payload 506. The bits of the preamble 502 may have a known pattern, regardless of the device that transmits the BLE packet. The access address 504 is configured to provide device identification, based on the bits of the access address 504, that distinguishes the transmit device for the BLE packet from other transmit devices. The payload 506 that is to be received by the BLE device corresponds to the transmitted information from the transmit device.

During the scanning state, the BLE device may scan for a packet signature being advertised by the transmit device. The packet signature may include the preamble 502 and the access address 504. A sequence of bits in an access address for which the BLE device is configured to identify may similarly be known by the BLE device based on a predefined access address pattern. When a new packet is detected by the BLE device, a receiver mode of the RFA components may be switched from a low power mode 508 to a high power mode 510 for processing the incoming bits of the packet. BLE packets (e.g., advertising packets) have an access address 504 that is followed by a payload 506, both having bits which may all need to be correctly identified to maintain compliance with a BLE protocol.

However, switching from the low power mode 508 to the high power mode 510 after the packet has been detected by the BLE device often disturbs the received signal due to a change in the analog components of the receiver circuit (e.g., some bits may not be properly identified during a period of transition between the low power mode 508 and the high power mode 510) and may result in a packet reception error when the switch occurs. For instance, the switch may result in additional noise to the received signal that contributes to the packet reception error. If the switch/transition from the low power mode 508 to the high power mode 510 occurs during reception of the access address 504 or the payload 506, some bits may not be properly received and the BLE device may not be in compliance with the BLE protocol. While a missing bit from a known sequence of the access address 504 may not significantly degrade the received signal, BLE standards may require that the BLE device be configured to detect an error resulting from a randomly missing bit of the access address 504 to qualify the device as a BLE device. Thus, it may be desirable to refrain from performing the switch from the low power mode 508 to the high power mode 510 during receipt of either the access address 504 or the payload 506.

Furthermore, maintaining the BLE device in the low power mode 508 for the duration of packet reception may result in a packet reception error, as the low power mode 508 may cause the received signal to be noisier; and maintaining the BLE device in the high power mode for scanning (e.g., for 10 milliseconds) may result in an undesirable power consumption during the scanning state. Thus, in order to provide a desirable level of receiver performance, the RFA components of the receiver may be initially set to the low power mode 508 (e.g., high noise configuration) during the scanning state and then switched to the high power mode 510 based on preamble detection 512, as the preamble 502 may not be subject to the same protocol constraints as the access address 504 and the payload 506, which require complete reception/identification of all the corresponding bits of the access address and the payload. That is, even if one or more of the bits in the preamble 502 is corrupted (e.g., due to a switching of power modes), packet reception may still be in compliance with the protocol.

Accordingly, a low-power scanning technique may be utilized by the receiver until an incoming packet is detected based on preamble bits, at which time the receiver may be switched from the low power mode 508 to the high power mode 510 before reception and processing of the access address 504 (and payload 506) begins. With more specificity, the switch from the low power mode 508 to the high power mode 510 may be performed during the preamble portion of the packet based on a preamble detection algorithm configured to detect the preamble 502 during a short duration of the preamble 502. The timing of such a switch permits the receiver to operate in the low-power mode during the scanning state until a new packet is detected without impacting reception/processing of the access address bits and payload bits of the packet.

BLE packets typically include a fixed number of bits for the preamble 502 that are received immediately before the access address 504. In particular, the preamble 502 may be 8 bits and each bit may be 1 microsecond in duration to provide an 8 microsecond preamble. The switch from the low power mode 508 to the high power mode 510 may be performed in 1-2 microsecond(s). Thus, even if preamble detection 512 does not occur until 6 microseconds into the preamble 502, the switch of the receiver analog components from the low power mode 508 to the high power mode 510 may still be completed before the bits of the access address 504 begin to arrive at the receiver. The process of switching the receiver from the low power mode 508 to the high power mode 510 may also be implemented with respect to components that are outside the RFA, such as portions of digital signal processing and/or control logic. Moreover, such processes may be similarly employed with respect to packets received during the connection state (e.g., non-scanning state) to further reduce the power consumption of the receiver.

Figure 6:
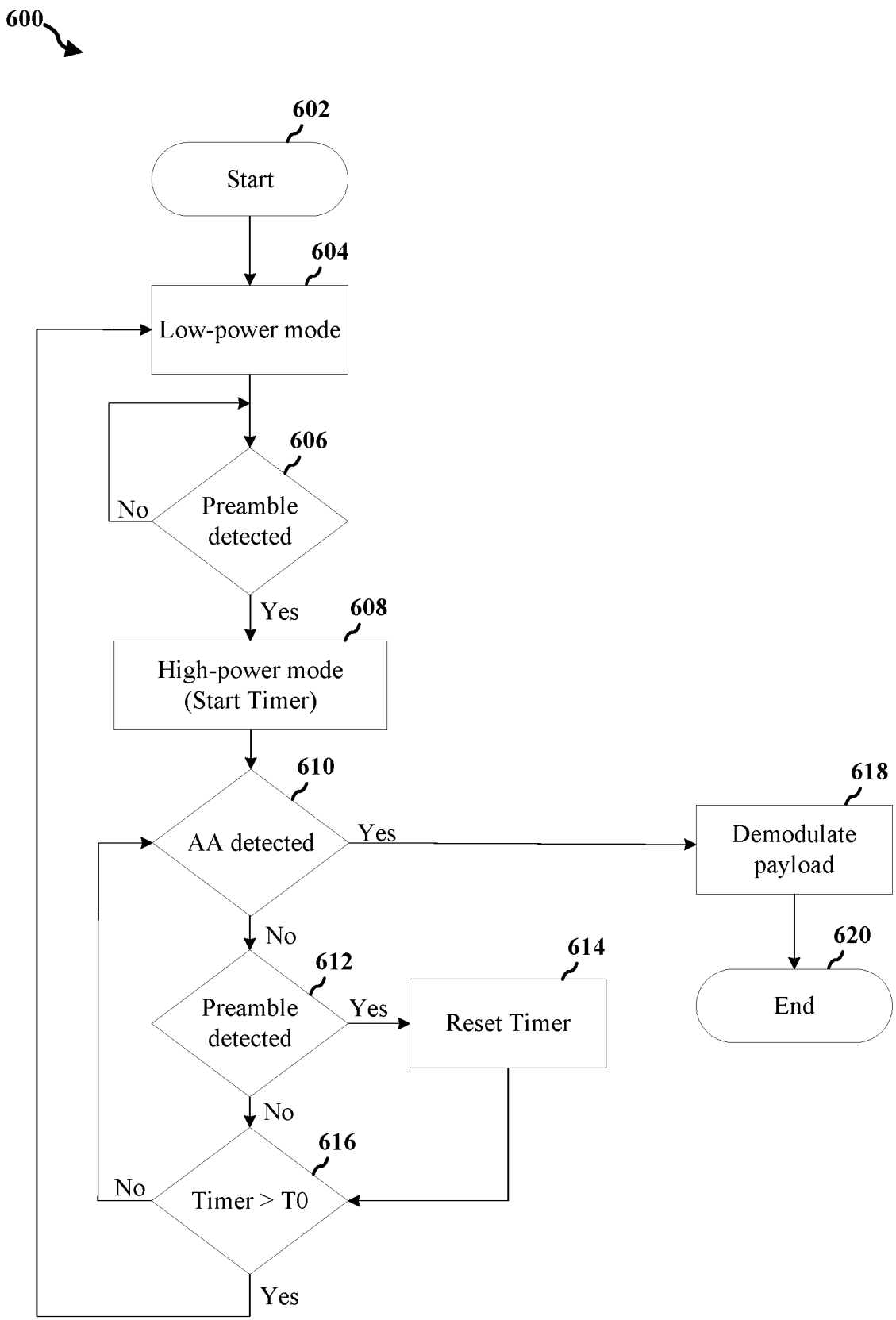
FIG. 6 is a diagram that illustrates an exemplary technique for switching power modes of a receiver.

FIG. 6 is a diagram 600 that illustrates an exemplary technique for switching power modes of a receiver. In aspects, the technique may be implemented to switch a receiver of a BLE device from a low power mode to a high power mode while decreasing an impact on power consumption caused by false detection of a packet. For example, a false detection of a packet may cause the receiver to switch to the high power mode even though a packet is not actually being received and the receiver should otherwise remain in the low power mode/scanning state.

The diagram 600 starts at 602 based on a scanning time window for which the receiver of the BLE device may be configured in a scanning state. At 604, the receiver is initially set to a low power mode during execution of a preamble detection algorithm. Samples from the scanning procedure may be received by the receiver and evaluated based on the preamble detection algorithm, which determines at 606 whether a preamble is detected. For example, a plurality of samples in a sample set received during the scanning time window may be processed together to determine based on the preamble detection algorithm whether a recent sample in the sample set is indicative of a preamble. If the preamble is not detected based on a first sample set, the preamble detection algorithm evaluates a next sample set until a preamble is identified. Upon detection of the preamble at 606, the receiver is switched to a high power mode at 608 in anticipation of processing a remainder of an incoming packet. A timer is also initiated at 608 when the receiver is switched to the high power mode based on a known/fixed time of a preamble and an access address. For example, a preamble may have a fixed duration of 8 microseconds (e.g., 8 bits) and an access address may have a fixed duration of 32 microseconds (e.g., 32 bits). If the timer indicates that the fixed duration of the access address has lapsed when measured from an end of the preamble and the access address has still not been detected, the initial preamble detection at 606 may have been a false detection.

After switching the receiver to the high power mode at 608, an access address detection algorithm is similarly executed for detecting the access address. If, at 610, the access address is detected, a payload may be subsequently demodulated at 618 following conclusion of receiving the access address, such that the diagram 600 may end at 620. The access address detection algorithm may be configured to detect an end of the access address based on the timer and the fixed duration of the access address/fixed number of bits that follow preamble detection to initiate demodulation of the payload at 618. A timer threshold for the BLE device may lapse at up to 40 microseconds based on the combined fixed durations of the preamble (e.g., 8 microseconds) and the access address (e.g., 32 microseconds). However, in practice the timer threshold may be set to less than 40 microseconds, as the preamble detection algorithm may be configured to detect the preamble at a subsequent preamble bit to the first preamble bit. For example, the preamble detection algorithm may be configured to detect the preamble at a sixth preamble bit such that the timer threshold may be 34 microseconds (e.g., 2 microseconds to complete a remainder of the fixed preamble duration and another 32 microseconds for the total fixed duration of the access address).

If, at 610, the access address is not detected, the preamble detection algorithm may be re-executed, at 612, to determine whether the initial preamble detection at 606 was a false detection or whether the access address has yet to be detected at 610 by the access address detection algorithm. If the preamble is detected again at 612, the initial preamble detection at 606 may have been a false detection and the timer is reset at 614. If the preamble is not detected again at 612, the timer continues to accrue based on the initial start time of the timer at 608. In either case, a determination is made at 616 regarding whether the timer (e.g., the timer as initially set at 608 or the timer as reset at 614) is greater than $T_0$, where $T_0$ corresponds to a time period from the end of preamble detection to the end of the access address.

If, at 616, the timer is not greater than $T_0$, the access address detection algorithm may be re-executed at 610 to again determine whether detection of the access address occurs. If, at 616, the timer is greater than $T_0$, a window of time corresponding to a duration of the access address has been exceeded and the receiver of the BLE device may be reset to the low power mode at 604, as the initial preamble detection at 606 may have been a false detection.

Figure 7:
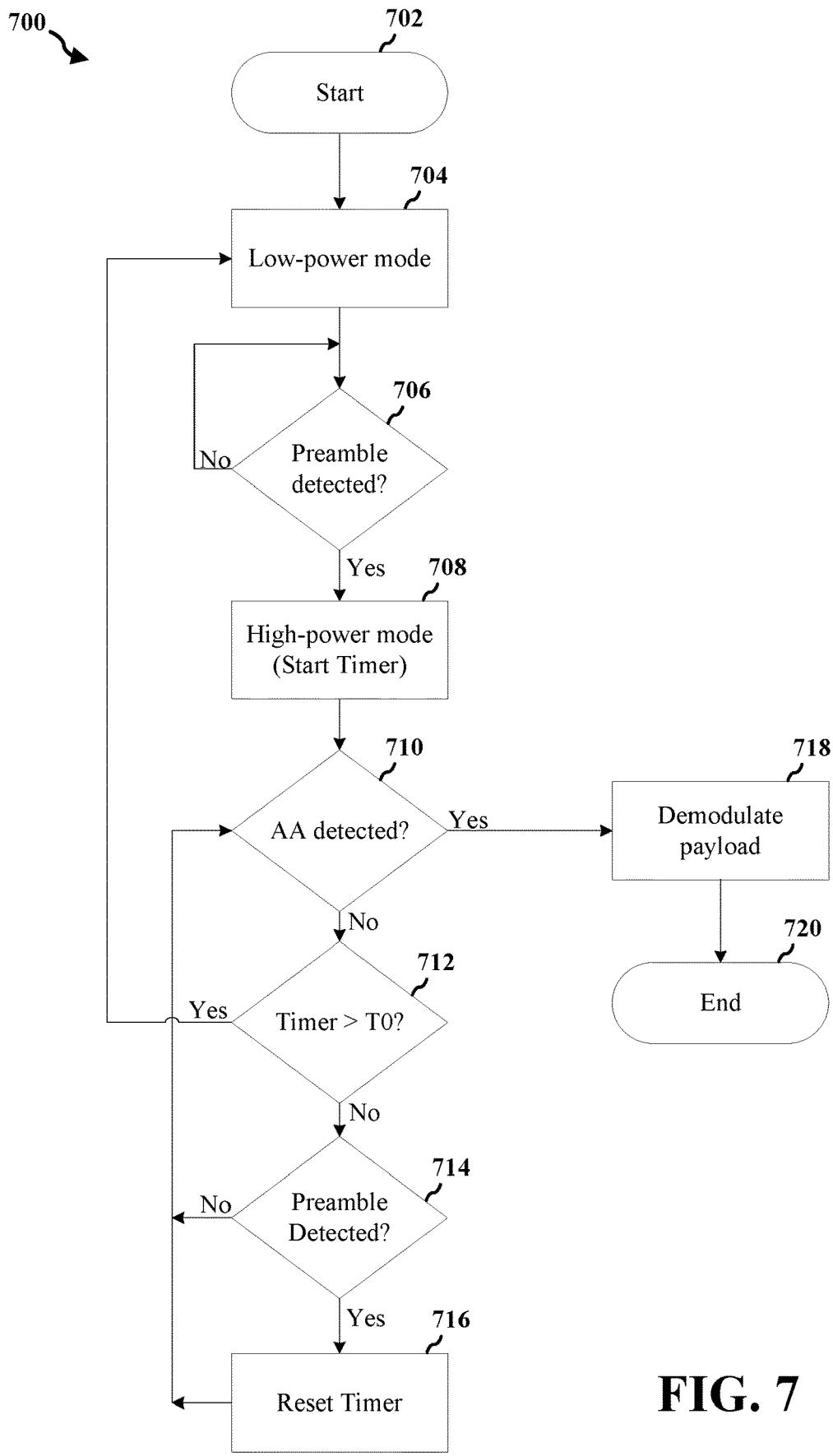
FIG. 7 is a diagram that illustrates an exemplary technique for switching power modes of a receiver.

FIG. 7 is a diagram 700 that illustrates an exemplary technique for switching power modes of a receiver. In aspects, the technique may be implemented to switch a receiver of a BLE device from a low power mode to a high power mode while decreasing an impact on power consumption caused by false detection of a packet. For example, a false detection of a packet may cause the receiver to switch to the high power mode even though a packet is not actually being received and the receiver should otherwise remain in the low power mode/scanning state.

The diagram 700 starts at 702 based on a scanning time window for which the receiver of the BLE device may be configured in a scanning state. At 704, the receiver is initially set to a low power mode during execution of a preamble detection algorithm. Samples from the scanning procedure may be received by the receiver and evaluated based on the preamble detection algorithm, which determines at 706 whether a preamble is detected. For example, a plurality of samples in a sample set received during the scanning time window may be processed together to determine based on the preamble detection algorithm whether a recent sample in the sample set is indicative of a preamble. If the preamble is not detected based on a first sample set, the preamble detection algorithm evaluates a next sample set until a preamble is identified. Upon detection of the preamble at 706, the receiver is switched to a high power mode at 708 in anticipation of processing a remainder of an incoming packet. A timer is also initiated at 708 when the receiver is switched to the high power mode based on a known/fixed time of a preamble and an access address. For example, a preamble may have a fixed duration of 8 microseconds (e.g., 8 bits) and an access address may have a fixed duration of 32 microseconds (e.g., 32 bits). If the timer indicates that the fixed duration of the access address has lapsed when measured from an end of the preamble and the access address has still not been detected, the initial preamble detection at 706 may have been a false detection.

After switching the receiver to the high power mode at 708, an access address detection algorithm is similarly executed for detecting the access address. If, at 710, the access address is detected, a payload may be subsequently demodulated at 718 following conclusion of receiving the access address, such that the diagram 700 may end at 720. The access address detection algorithm may be configured to detect an end of the access address based on the timer and the fixed duration of the access address/fixed number of bits that follow preamble detection to initiate demodulation of the payload at 718. A timer threshold for the BLE device may lapse at up to 40 microseconds based on the combined fixed durations of the preamble (e.g., 8 microseconds) and the access address (e.g., 32 microseconds). However, in practice the timer threshold may be set to less than 40 microseconds, as the preamble detection algorithm may be configured to detect the preamble at a subsequent preamble bit to the first preamble bit. For example, the preamble detection algorithm may be configured to detect the preamble at a sixth preamble bit such that the timer threshold may be 34 microseconds (e.g., 2 microseconds to complete a remainder of the fixed preamble duration and another 32 microseconds for the total fixed duration of the access address).

If, at 710, the access address is not detected, a determination is made at 712 regarding whether the timer is greater than $T_0$, where $T_0$ corresponds to a time period from the end of preamble detection to the end of the access address. If, at 712, the timer is greater than $T_0$, a window of time corresponding to a duration of the access address has been exceeded and the receiver of the BLE device may be reset to the low power mode at 704, as the initial preamble detection at 706 may have been a false detection. If, at 712, the timer is not greater than $T_0$, the preamble detection algorithm may be re-executed, at 714, to determine whether the initial preamble detection at 706 was a false detection or whether the access address has yet to be detected at 710 by the access address detection algorithm.

If the preamble is detected again at 714, the initial preamble detection at 706 may have been a false detection and the timer is reset at 716. If the preamble is not detected again at 714, the timer continues to accrue based on the initial start time of the timer at 708. In either case, the access address detection algorithm may be re-executed at 710 to again determine whether detection of the access address occurs.

Figure 8:
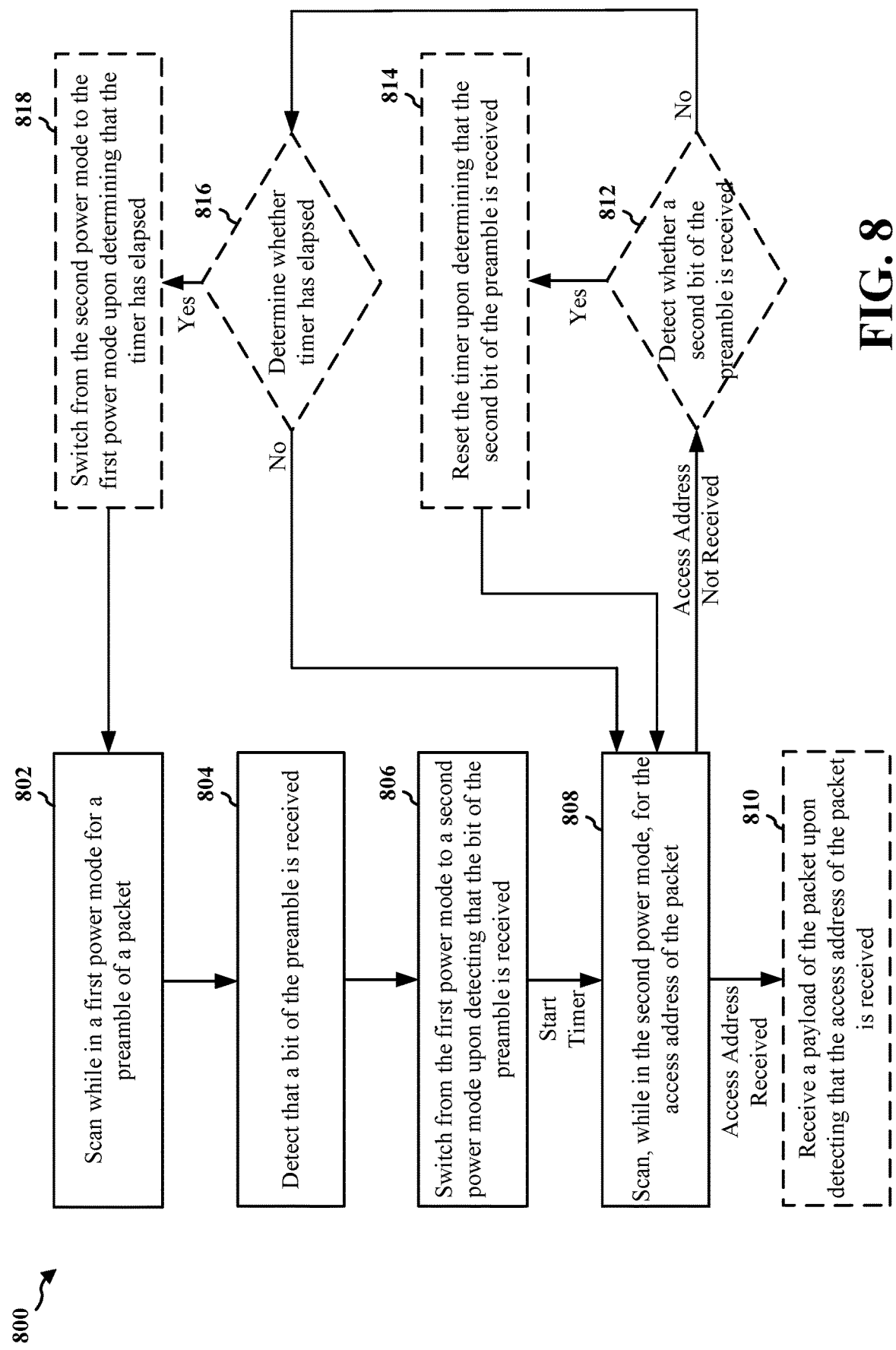
FIG. 8 is a flowchart of a method of wireless communication of a communication device.

FIG. 8 is a flowchart 800 of an example method of wireless communication of a device (e.g., a BLE device) in accordance with one or more techniques of this disclosure. The method illustrated in the flowchart 800 may be performed by any wireless communication device as used in connection with the examples of FIGS. 1-7.

At 802, the device scans while in a first power mode for a preamble of a packet. For example, the device may be a BLE device and the packet may be a BLE packet. With reference to FIG. 6, the device is set, at 604, to a low power mode and determines, at 606, based on a scan for a preamble of a packet whether a preamble is detected. At 804, the device detects that a bit of the preamble is received. For example, referring to FIG. 6, the device may generate an indication, based on the determination at 606, that a bit of the preamble has been received. The preamble may comprise n bits and may be detected after receiving n–m bits. In an example, n may be equal to 8 bits and m may be less than or equal to 2 bits.

At 806, the device switches from the first power mode to a second power mode upon detecting that the bit of the preamble is received. For example, referring to FIG. 6, the devices switches, at 608, to a high power mode from the low power mode established at 604 based on the indication received from the determination, at 606, that a bit of the preamble has been detected/received. The second power mode has a higher operating power for the communication device than the first power mode. Further, the switch from the first power mode to the second power mode may occur while the preamble is being received or immediately after the preamble is received and before an access address of the packet is received. The device may start a timer upon switching from the first power mode to the second power mode. For example, referring to FIG. 6, a timer is started at 608 to track an elapsed time since an end of the preamble detection at 606.

At 808, the device scans, while in the second power mode, for the access address of the packet. For example, referring to FIG. 6, the device scans, at 610, for detection/receipt of the access address. The scan for the access address of the packet may include detecting whether the access address of the packet is received. For example, at 810, the device may receive a payload of the packet upon detecting that the access address of the packet is received. Referring to FIG. 6, the device may demodulate the received payload at 618 based on detection of the access address at 610. Alternatively, at 812, the device may detect whether a second bit of the preamble is received upon detecting that the access address of the packet is not received. Referring to FIG. 6, the device may re-execute a preamble detection algorithm, at 612, to scan for a second bit of the preamble.

At 814, the device may reset the timer upon determining, at 812, that the second bit of the preamble is received. For example, referring to FIG. 6, the timer may be reset at 614 based on an indication via the determination, at 612, that a second bit of the preamble has been detected. Additionally, the device may scan for the access address of the packet after resetting the timer. For example, referring to FIG. 6, the device may again scan, at 610, for the access address of the packet after the timer is reset at 614 (e.g., based on the timer not exceeding a timer threshold at 616).

At 816, the device may determine whether the timer has elapsed upon determining, at 812, that the second bit of the preamble is not received. For example referring to FIG. 6, the device may determine, at 616, whether the timer set at 608 has elapsed based on an indication from the determination, at 612, that a second bit of the preamble was not detected. In configurations, the timer elapses, at 616, after a timer threshold, where the timer threshold corresponds to a time difference between detecting that the bit of the preamble is received and an end of an access address (e.g., an end of a predetermined time period corresponding to a number of bits to be received for the access address). The device may scan for the access address of the packet after determining that the timer has not elapsed. For example, referring to FIG. 6, the device may again scan, at 610, for the access address of the packet after determining, at 616, that the timer threshold is not exceeded.

At 818, the device may switch from the second power mode to the first power mode upon determining, at 816, that the timer has elapsed. For example, referring to FIG. 6, the device may be reset, at 604, to the low power mode (e.g., to re-initiate the scanning mode of the device) upon determining, at 616, that the timer threshold is exceeded. The device may scan while in the first power mode for another preamble of a second packet. For example, referring to FIG. 6, the device may scan for another preamble of a second packet to provide a determination, at 606, regarding whether another preamble is detected.

Figure 9:
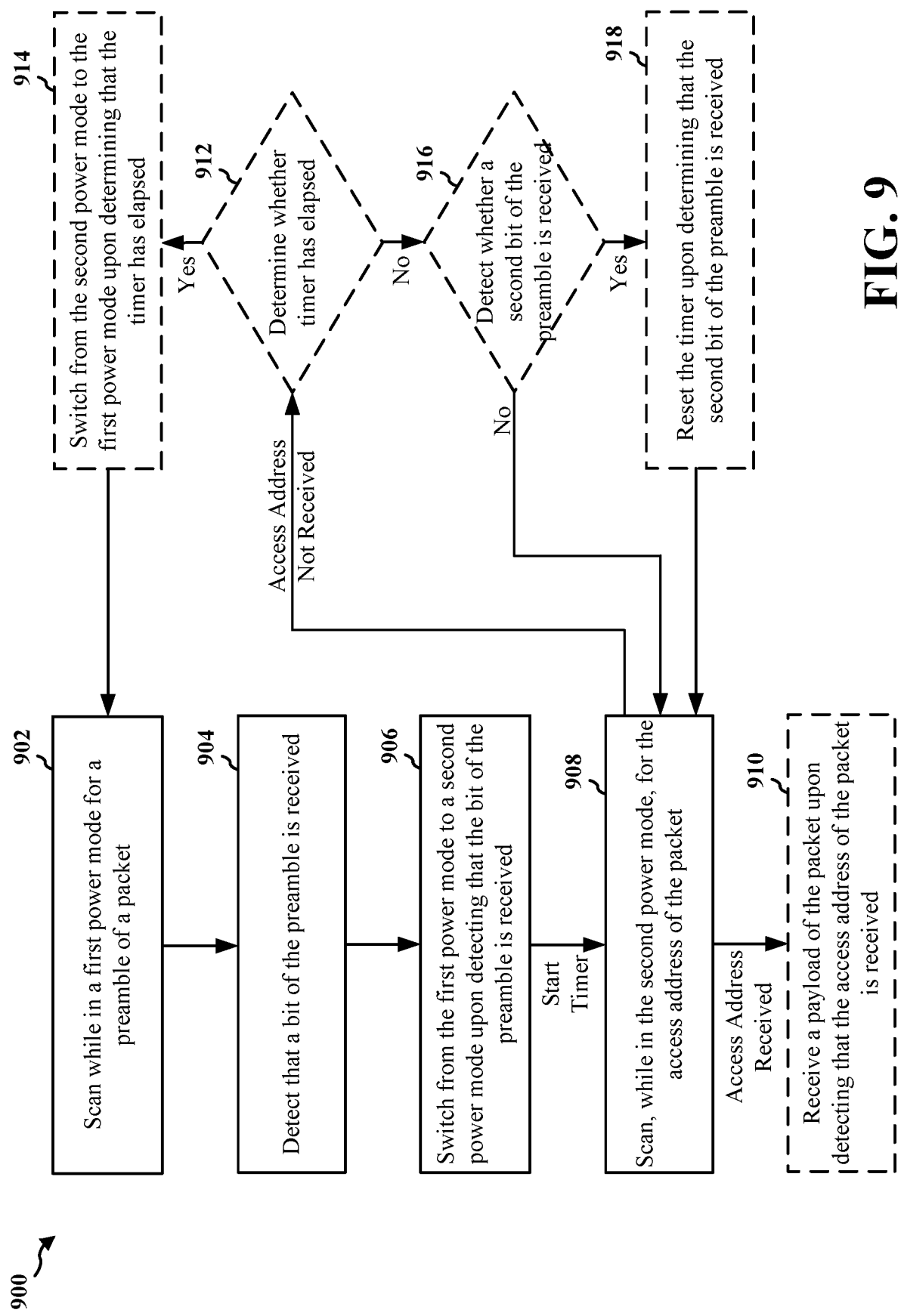
FIG. 9 is a flowchart of a method of wireless communication of a communication device.

FIG. 9 is a flowchart 900 of an example method of wireless communication of a device (e.g., a BLE device) in accordance with one or more techniques of this disclosure. The method illustrated in the flowchart 900 may be performed by any wireless communication device as used in connection with the examples of FIGS. 1-7.

At 902, the device scans while in a first power mode for a preamble of a packet. For example, the device may be a BLE device and the packet may be a BLE packet. With reference to FIG. 7, the device is set, at 704, to a low power mode and determines, at 706, based on a scan for a preamble of a packet whether a preamble is detected. At 904, the device detects that a bit of the preamble is received. For example, referring to FIG. 7, the device may generate an indication, based on the determination at 706, that a bit of the preamble has been received. The preamble may comprise n bits and may be detected after receiving n–m bits. In an example, n may be equal to 8 bits and m may be less than or equal to 2 bits.

At 906, the device switches from the first power mode to a second power mode upon detecting that the bit of the preamble is received. For example, referring to FIG. 7, the devices switches, at 708, to a high power mode from the low power mode established at 704 based on the indication received from the determination, at 706, that a bit of the preamble has been detected/received. The second power mode has a higher operating power for the communication device than the first power mode. Further, the switch from the first power mode to the second power mode may occur while the preamble is being received or immediately after the preamble is received and before an access address of the packet is received. The device may start a timer upon switching from the first power mode to the second power mode. For example, referring to FIG. 7, a timer is started at 708 to track an elapsed time since an end of the preamble detection at 706.

At 908, the device scans, while in the second power mode, for the access address of the packet. For example, referring to FIG. 7, the device scans, at 710, for the access address. The scan for the access address of the packet may include detecting whether the access address of the packet is received. For example, at 910, the device may receive a payload of the packet upon detecting that the access address of the packet is received. Referring to FIG. 7, the device may demodulate the received payload at 718 based on detection of the access address at 710. Alternatively, at 912, the device may determine whether the timer has elapsed upon detecting that the access address of the packet is not received. Referring to FIG. 7, the device may determine, at 712, whether the timer set at 708 has elapsed based on an indication from the determination, at 710, that the access address is not received. In some configurations, the timer elapses, at 712, after a timer threshold, where the timer threshold corresponds to a time difference between detecting that the bit of the preamble is received and an end of an access address (e.g., an end of a predetermined time period corresponding to a number of bits to be received for the access address).

At 914, the device may switch from the second power mode to the first power mode upon determining, at 912, that the timer has elapsed. For example, referring to FIG. 7, the device may be reset, at 704, to the low power mode (e.g., to re-initiate the scanning mode of the device) upon determining, at 712, that the timer threshold is exceeded. The device may scan while in the first power mode for another preamble of a second packet. For example, referring to FIG. 7, the device may scan for another preamble of a second packet to provide a determination, at 706, regarding whether another preamble is detected.

At 916, the device may detect whether a second bit of the preamble is received upon determining, at 912, that the timer has not elapsed. For example, referring to FIG. 7, the device may re-execute a preamble detection algorithm, at 714, to scan for a second bit of the preamble. The device may scan for the access address of the packet after determining that the second bit of the preamble is not received. For example, referring to FIG. 7, the device may again scan, at 710, for the access address of the packet after determining, at 714, that a second bit of the preamble was not detected.

At 918, the device may reset the timer upon determining, at 916, that the second bit of the preamble is received. For example, referring to FIG. 7, the timer may be reset at 716 based on an indication via the determination, at 714, that a second bit of the preamble has been detected. Additionally, the device may scan for the access address of the packet after resetting the timer. For example, referring to FIG. 7, the device may again scan, at 710, for the access address of the packet after the timer is reset at 716.

Figure 10:
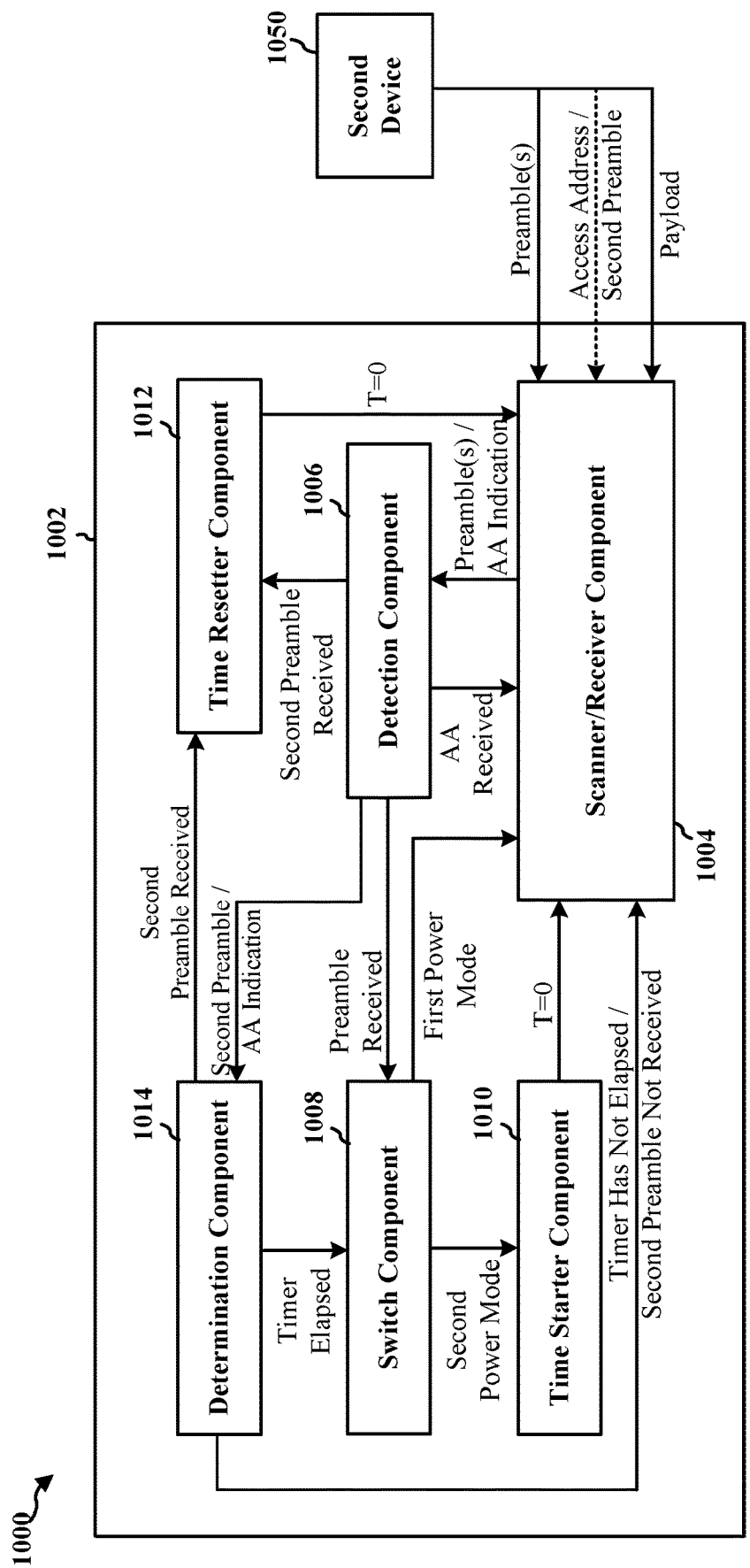
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus 1002 may be a BLE device, a BT device, or any other wireless communication device. The apparatus 1002 includes a scanner/receiver component 1004 that scans for a preamble of a packet (e.g., a BLE packet) that may be advertised by a second device 1050. The scanner/receiver component 1004 may operate in different power modes, such as a first (low) power mode and a second (high) power mode. For example, as described in connection with 802 and 902, the scanner/receiver component 1004 may scan while in a first power mode for a preamble of the packet.

The apparatus 1002 includes a detection component 1006 configured to receive an indication from the scanner/receiver component 1004 regarding preamble detection. For example, as described in connection with 804 and 904, the detection component 1006 may detect that a bit of the preamble is received. The apparatus 1002 further includes a switch component 1008 that switches a power mode of the apparatus 1002 (e.g., a power mode of the scanner/receiver component 1004) from the first power mode to the second power mode based on an indication that the bit of the preamble was detected/received. For example, as described in connection with 806 and 906, the switch component 1008 may switch from the first power mode to the second power mode upon detecting that the bit of the preamble is received.

The apparatus 1002 includes a time starter component 1010 that may start a timer upon the apparatus 1002 being switched from the first power mode to the second power mode. As described in connection with 808 and 908, the scanner/receiver component 1004, while in the second power mode, may scan for the access address of the packet (e.g., the access address of the packet having the preamble advertised by the second device 1050). In aspects, the scanner/receiver component 1004 may scan while in the second power mode for the access address of the packet, either independently of or based on the time starter component 1010 starting the timer at T=0.

For receiving the access address of the packet, the scanner/receiver component 1004 may provide an indication of the access address of the packet to the detection component 1006, which may detect whether the access address is received from the second device 1050. The scanner/receiver component 1004 may receive a payload of the packet from the second device 1050 based on an indication from the detection component 1006 that the access address is received. For example, as described in connection with 810 and 910, the scanner/receiver component 1004 may receive a payload of the packet upon detecting that the access address of the packet is received.

When the indication of the access address indicates that the access address is not received, the detection component 1006 may receive an indication of a second bit of the preamble from scanner/receiver component 1004. For example, as described in connection with 812, the detection component 1006 may detect whether a second bit of the preamble is received upon detecting that the access address of the packet is not received. Alternatively, when the indication of the access address indicates that the access address is not received, the indication of the access address may be provided to the determination component 1014 to determine a status of the timer. For example, as described in connection with 912, the determination component 1014 may determine whether the timer has elapsed upon detecting that the access address of the packet is not received. The determination component 1014 may also receive an indication of the second bit of the preamble from the detection component 1006.

The apparatus 1002 includes a time resetter component 1012 configured to reset the timer to T=0 upon receiving an indication that the second bit of the preamble is received. For example, as described in connection with 814 and 918, the time resetter component 1012 may reset the timer upon determining/detecting (e.g., by the determination component 1014 and/or the detection component 1006) that the second bit of the preamble is received. Accordingly, the scanner/receiver component 1004 may again scan for the access address of the packet after resetting the timer to T=0.

In some configurations, as described in connection with 816, the determination component 1014 may determine whether the timer has elapsed upon determining that the second bit of the preamble is not received. Further, the scanner/receiver component 1004 may scan for the access address of the packet after determining that the second bit of the preamble is not received. In other configurations, as described in connection with 916, the detection component 1006 may detect whether the second bit of the preamble is received after the determination component 1014 determines that the timer has not elapsed. Further, the scanner/receiver component 1004 may scan for the access address of the packet after determining that the timer has not elapsed.

The switch component 1008 may switch the apparatus 1002 back to the first power mode when the timer has elapsed. For example, as described in connection with 818 and 914, the switch component 1008 may switch from the second power mode to the first power mode upon determining that the timer has elapsed. As such, the scanner/receiver component 1004 may scan while in the first power mode for another preamble of a second packet (e.g., another preamble/packet advertised by the second device 1050).

The apparatus 1002 may include additional components that perform each of the blocks of the algorithm in the aforementioned flowcharts of FIGS. 8-9. As such, each block in the aforementioned flowcharts of FIGS. 8-9 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
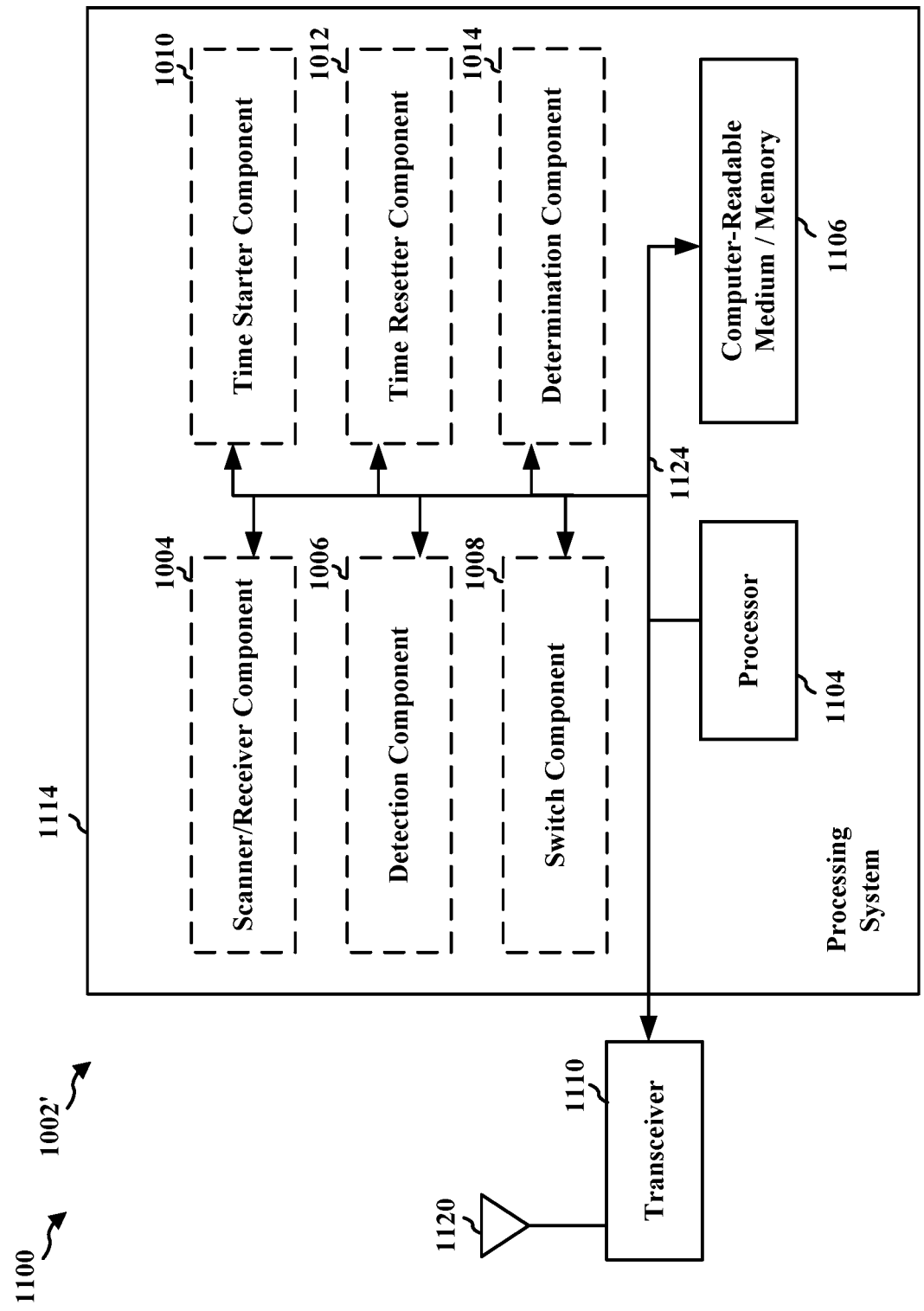
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004-1014 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the scanner/receiver component 1004. In addition, the transceiver 1110 receives information from the processing system 1114 and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004-1014. The components 1004-1014 may be software components running in the processor 1104, resident/stored in the computer readable medium/memory 1106, one or more hardware components coupled to the processor 1104, or some combination thereof.

In one configuration, the apparatus 1002/1002' for wireless communication includes means for scanning, receiving, detecting, switching, starting, resetting, and determining. The aforementioned means may be one or more of the aforementioned components 1004-1014 of the apparatus 1002 and/or the processing system 1114 of the apparatus 1002' configured to perform the functions recited by the aforementioned means.

Accordingly, execution of a preamble detection algorithm configured to identify the preamble of an incoming BLE packet, despite the short duration of the preamble, may allow the BLE device to detect the incoming BLE packet before any bits of the access address arrive at the receiver of the BLE device. As such, the BLE device may be switched from the low power mode to the higher mode while the preamble is still being received or immediately after the preamble is received but before the access address is received, such that if a bit is corrupted as a result of the switch in power modes, the corrupted bit corresponds to the preamble and not to the access address or the payload. With respect to the BLE protocol that prohibits corruption of bits of the access address and the payload, the bits of the preamble may not be subject to the same requirement. Thus, even if a preamble bit is corrupted by the switch from the low power mode to the high power mode, the BLE device may still be in compliance with the BLE protocol. The timing of such a switch at the preamble permits the receiver to operate in the low power mode while scanning for BLE packets and subsequently transition to the high power mode for packet processing without impacting reception of the access address and the payload.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a communication device, comprising:
   scanning while in a first power mode for a preamble of a packet;
   detecting that a bit of the preamble is received;
   switching from the first power mode to a second power mode upon detecting that the bit of the preamble is received, the second power mode having a higher operating power for the communication device than the first power mode, the switching occurring while the preamble is being received, or immediately after the preamble is received and before a first bit of an access address of the packet is received; and
   scanning, while in the second power mode, for the access address of the packet.

2. The method of claim 1, wherein the scanning for the access address of the packet comprises detecting whether the access address of the packet is received.

3. The method of claim 2, further comprising receiving a payload of the packet upon detecting that the access address of the packet is received.

4. The method of claim 2, further comprising:
   starting a timer upon switching from the first power mode to the second power mode; and
   detecting whether a second bit of the preamble is received upon detecting that the access address of the packet is not received.

5. The method of claim 4, further comprising:
   resetting the timer upon determining that the second bit of the preamble is received; and
   scanning for the access address of the packet after resetting the timer.

6. The method of claim 4, further comprising determining whether the timer has elapsed upon determining that the second bit of the preamble is not received.

7. The method of claim 6, further comprising scanning for the access address of the packet after determining that the timer has not elapsed.

8. The method of claim 6, further comprising:
   switching from the second power mode to the first power mode upon determining that the timer has elapsed; and
   scanning while in the first power mode for another preamble of a second packet.

9. The method of claim 6, wherein the timer elapses after a timer threshold, the timer threshold corresponding to a time difference between detecting that the bit of the preamble is received and an end of the access address.

10. The method of claim 2, further comprising:
    starting a timer upon switching from the first power mode to the second power mode; and
    determining whether the timer has elapsed upon detecting that the access address of the packet is not received.

11. The method of claim 10, further comprising:
    switching from the second power mode to the first power mode upon determining that the timer has elapsed; and
    scanning while in the first power mode for another preamble of a second packet.

12. The method of claim 10, further comprising detecting whether a second bit of the preamble is received upon determining that the timer has not elapsed.

13. The method of claim 12, further comprising scanning for receiving the access address of the packet after determining that the second bit of the preamble is not received.

14. The method of claim 12, further comprising:
    resetting the timer upon determining that the second bit of the preamble is received; and
    scanning for the access address of the packet after resetting the timer.

15. The method of claim 1, wherein the communication device is a Bluetooth Low Energy (BLE) device and the packet is a BLE packet.

16. The method of claim 1, wherein the preamble comprises n bits, and the preamble is detected after receiving nm bits of the preamble.

17. The method of claim 16, wherein m is less than or equal to 2.

18. The method of claim 16, wherein n is equal to 8.

19. An apparatus for wireless communication, the apparatus being a communication device, comprising:
    means for scanning while in a first power mode for a preamble of a packet;
    means for detecting that a bit of the preamble is received;
    means for switching from the first power mode to a second power mode upon detecting that the bit of the preamble is received, the second power mode having a higher operating power for the communication device than the first power mode, the switching occurring while the preamble is being received, or immediately after the preamble is received and before an access address of the packet is received; and
    means for scanning, while in the second power mode, for the access address of the packet.

20. The apparatus of claim 19, wherein the means for scanning for the access address of the packet is configured to detect whether the access address of the packet is received.

21. The apparatus of claim 20, further comprising means for receiving a payload of the packet upon detecting that the access address of the packet is received.

22. The apparatus of claim 20, further comprising:
    means for starting a timer upon switching from the first power mode to the second power mode; and
    means for detecting whether a second bit of the preamble is received upon detecting that the access address of the packet is not received.

23. The apparatus of claim 22, further comprising:
    means for resetting the timer upon determining that the second bit of the preamble is received; and means for scanning for the access address of the packet after resetting the timer.

24. The apparatus of claim 22, further comprising means for determining whether the timer has elapsed upon determining that the second bit of the preamble is not received.

25. The apparatus of claim 24, further comprising means for scanning for the access address of the packet after determining that the timer has not elapsed.

26. The apparatus of claim 24, further comprising:
means for switching from the second power mode to the first power mode upon determining that the timer has elapsed; and
means for scanning while in the first power mode for another preamble of a second packet.

27. The apparatus of claim 24, wherein the timer elapses after a timer threshold, the timer threshold corresponding to a time difference between detecting that the bit of the preamble is received and an end of the access address.

28. The apparatus of claim 20, further comprising:
means for starting a timer upon switching from the first power mode to the second power mode; and
means for determining whether the timer has elapsed upon detecting that the access address of the packet is not received.

29. The apparatus of claim 28, further comprising:
means for switching from the second power mode to the first power mode upon determining that the timer has elapsed; and
means for scanning while in the first power mode for another preamble of a second packet.

30. The apparatus of claim 28, further comprising means for detecting whether a second bit of the preamble is received upon determining that the timer has not elapsed.

31. The apparatus of claim 30, further comprising means for scanning for receiving the access address of the packet after determining that the second bit of the preamble is not received.

32. The apparatus of claim 30, further comprising:
means for resetting the timer upon determining that the second bit of the preamble is received; and
means for scanning for the access address of the packet after resetting the timer.

33. The apparatus of claim 19, wherein the communication device is a Bluetooth Low Energy (BLE) device and the packet is a BLE packet.

34. The apparatus of claim 19, wherein the preamble comprises n bits, and the preamble is detected after receiving nm bits of the preamble.

35. The apparatus of claim 34, wherein m is less than or equal to 2.

36. The apparatus of claim 34, wherein n is equal to 8.

37. An apparatus for wireless communication, the apparatus being a communication device, comprising:
a memory; and
at least one processor coupled to the memory and configured to:
scan while in a first power mode for a preamble of a packet;
detect that a bit of the preamble is received;
switch from the first power mode to a second power mode upon detecting that the bit of the preamble is received, the second power mode having a higher operating power for the communication device than the first power mode, the switch occurring while the preamble is being received, or immediately after the preamble is received and before a first bit of an access address of the packet is received; and
scan, while in the second power mode, for the access address of the packet.

38. The apparatus of claim 37, wherein for the scan for receiving the access address of the packet the at least one processor is further configured to detect whether the access address of the packet is received.

39. The apparatus of claim 38, wherein the at least one processor is further configured to receive a payload of the packet upon detecting that the access address of the packet is received.

40. The apparatus of claim 38, wherein the at least one processor is further configured to:
start a timer upon switching from the first power mode to the second power mode; and
detect whether a second bit of the preamble is received upon detecting that the access address of the packet is not received.

41. The apparatus of claim 40, wherein the at least one processor is further configured to:
reset the timer upon determining that the second bit of the preamble is received; and
scan for the access address of the packet after resetting the timer.

42. The apparatus of claim 40, wherein the at least one processor is further configured to determine whether the timer has elapsed upon determining that the second bit of the preamble is not received.

43. The apparatus of claim 42, wherein the at least one processor is further configured to scan for the access address of the packet after determining that the timer has not elapsed.

44. The apparatus of claim 42, wherein the at least one processor is further configured to:
switch from the second power mode to the first power mode upon determining that the timer has elapsed; and
scan while in the first power mode for another preamble of a second packet.

45. The apparatus of claim 42, wherein the timer elapses after a timer threshold, the timer threshold corresponding to a time difference between detecting that the bit of the preamble is received and an end of the access address.

46. The apparatus of claim 38, wherein the at least one processor is further configured to:
start a timer upon switching from the first power mode to the second power mode; and
determine whether the timer has elapsed upon detecting that the access address of the packet is not received.

47. The apparatus of claim 46, wherein the at least one processor is further configured to:
switch from the second power mode to the first power mode upon determining that the timer has elapsed; and
scan while in the first power mode for another preamble of a second packet.

48. The apparatus of claim 46, wherein the at least one processor is further configured to detect whether a second bit of the preamble is received upon determining that the timer has not elapsed.

49. The apparatus of claim 48, wherein the at least one processor is further configured to scan for receiving the access address of the packet after determining that the second bit of the preamble is not received.

50. The apparatus of claim 48, wherein the at least one processor is further configured to:
reset the timer upon determining that the second bit of the preamble is received; and
scan for the access address of the packet after resetting the timer.

51. The apparatus of claim 37, wherein the communication device is a Bluetooth Low Energy (BLE) device and the packet is a BLE packet.

52. The apparatus of claim 37, wherein the preamble comprises n bits, and the preamble is detected after receiving n−m bits of the preamble.

53. The apparatus of claim 52, wherein m is less than or equal to 2.

54. The apparatus of claim 52, wherein n is equal to 8.

55. A computer-readable medium storing computer executable code, the code when executed by at least one processor of a communication device, causes the at least one processor to:

scan while in a first power mode for a preamble of a packet;

detect that a bit of the preamble is received;

switch from the first power mode to a second power mode upon detecting that the bit of the preamble is received, the second power mode having a higher operating power for the communication device than the first power mode, the switch occurring while the preamble is being received, or immediately after the preamble is received and before a first bit of an access address of the packet is received; and scan, while in the second power mode, for the access address of the packet.

* * * * *